US012375284B2

(12) United States Patent
Shi et al.

(10) Patent No.: US 12,375,284 B2
(45) Date of Patent: Jul. 29, 2025

(54) IDENTITY AUTHENTICATION METHOD, ELECTRONIC DEVICE, AND COMPUTER-READABLE STORAGE MEDIUM

(71) Applicant: Huawei Technologies Co., Ltd., Shenzhen (CN)

(72) Inventors: Rui Shi, Shenzhen (CN); Lu Gan, Shenzhen (CN); Chao He, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 97 days.

(21) Appl. No.: 18/341,985

(22) Filed: Jun. 27, 2023

(65) Prior Publication Data

US 2023/0344635 A1  Oct. 26, 2023

Related U.S. Application Data

(63) Continuation of application No. PCT/CN2021/135958, filed on Dec. 7, 2021.

(30) Foreign Application Priority Data

Dec. 28, 2020  (CN) .......................... 202011585354.9

(51) Int. Cl.
*H04L 9/32* (2006.01)
*H04L 9/08* (2006.01)
*H04W 12/06* (2021.01)

(52) U.S. Cl.
CPC .......... *H04L 9/3226* (2013.01); *H04L 9/0869* (2013.01); *H04W 12/06* (2013.01)

(58) Field of Classification Search
CPC . H04L 9/3226; H04L 9/0869; H04L 2209/80; H04L 9/3271; H04L 63/18;
(Continued)

(56) References Cited

U.S. PATENT DOCUMENTS

2013/0332739 A1\* 12/2013 Yi ........................ H04W 12/041
713/171
2018/0255592 A1  9/2018 Tsai et al.
(Continued)

FOREIGN PATENT DOCUMENTS

| CN | 1969499 A | 5/2007 |
|---|---|---|
| CN | 102298683 A | 12/2011 |
| CN | 110602679 A | 12/2019 |

*Primary Examiner* — Izunna Okeke
(74) *Attorney, Agent, or Firm* — Slater Matsil, LLP

(57) ABSTRACT

An identity authentication method and a mobile device. The mobile device performs receiving a first message of an electronic device within a second distance from the electronic device, where the first message includes a randomly generated session key, randomly generating first action information in response to the first message, and obtaining a second message by encrypting the first action information using the session key, sending the second message to the electronic device. displaying first confirmation information to determine whether the electronic device performs a first action indicated by the first action information, receiving first input used for confirmation, and prompting that identity authentication on the electronic device succeeds, where the second distance is less than or equal to a preset secure distance.

20 Claims, 22 Drawing Sheets

(58) Field of Classification Search
CPC ............. H04L 63/0853; H04L 63/0838; H04L 63/0428; H04W 12/06; H04W 12/64; H04W 12/03; H04W 4/70; H04W 4/80; H04W 12/041; H04W 12/71; H04W 12/63; G06F 2221/2111; G06F 21/36; G06F 21/44; G06F 9/542; G06F 9/546; G06F 21/35; G06F 21/602; Y02D 30/70

See application file for complete search history.

(56) References Cited

U.S. PATENT DOCUMENTS

| | | |
|---|---|---|
| 2019/0007833 A1 | 1/2019 | Takahashi |
| 2020/0210604 A1* | 7/2020 | Graf ..................... H04W 12/06 |

* cited by examiner

IDENTITY AUTHENTICATION METHOD, ELECTRONIC DEVICE, AND COMPUTER-READABLE STORAGE MEDIUM

CROSS-REFERENCE TO RELATED APPLICATIONS

This application is a continuation of International Application No. PCT/CN2021/135958, filed on Dec. 7, 2021, which claims priority to Chinese Patent Application No. 202011585354.9, filed on Dec. 28, 2020. The disclosures of the aforementioned applications are hereby incorporated by reference in their entireties.

TECHNICAL FIELD

This application relates to the field of information security, and in particular, to an identity authentication method, an electronic device, and a computer-readable storage medium.

BACKGROUND

A mobile device installed with an application (App) can quickly and conveniently control an electronic device, and is widely used. However, before controlling the electronic device, the mobile device needs to authenticate an identity of the electronic device. Specifically, the mobile device needs to ensure that the electronic device to be controlled is consistent with an electronic device displayed on the mobile device. Therefore, how to provide a high-security identity authentication method that has low costs and that is easy to promote becomes a requirement.

SUMMARY

To resolve the foregoing technical problem, this application provides an identity authentication method, an electronic device, and a computer-readable storage medium, so as to ensure high security, facilitate a user operation, improve user experience, reduce costs, and facilitate promotion.

According to a first aspect, a mobile device is provided. The mobile device wirelessly communicates with an electronic device. The mobile device includes a processor, a memory, and a computer program, where the computer program is stored in the memory, and when the computer program is executed by the processor, the mobile device is enabled to perform the following steps, including receiving a first message of the electronic device within a second distance from the electronic device, where the first message includes a session key randomly generated by the electronic device, randomly generating first action information or an authentication code in response to the first message, and encrypting the first action information or the authentication code by using the session key, to obtain a second message, sending the second message to the electronic device, displaying first confirmation information, where the first confirmation information is used to determine whether the electronic device performs a first action indicated by the first action information, or the first confirmation information is used to determine whether an authentication code displayed by the electronic device is the same as the authentication code displayed by the mobile device, receiving first input for confirmation, and in response to the first input, prompting that identity authentication on the electronic device succeeds, where the second distance is less than or equal to a preset secure distance, and the preset secure distance is a secure distance for exchanging secret information between the mobile device and the electronic device. In this way, a user determines whether the electronic device performs the first action indicated by the first action information, or whether the electronic device displays the authentication code displayed by the mobile device, so as to determine whether the mobile device has a session with the electronic device. If the mobile device has the session with the electronic device, it indicates that the session is normal, if the mobile device has no session with the electronic device, it indicates that an attack device simulates the electronic device to have a session with the mobile device. In this way, security is improved, and the user only needs to perform a simple operation. This is relatively low in costs and is easy to promote.

According to the first aspect, before the displaying first confirmation information, the mobile device further performs displaying the first action information or the authentication code.

According to any one of the first aspect or the foregoing implementation of the first aspect, before or after the sending the second message to the electronic device, the mobile device performs displaying the first action information or the authentication code.

According to a second aspect, an electronic device is provided. The electronic device wirelessly communicates with the mobile device according to any one of the first aspect or the foregoing implementation of the first aspect, and the electronic device includes a processor, a memory, a first antenna, where a transmission distance of the first antenna is a first distance, and the first distance is greater than a preset secure distance, a second antenna, where a transmission distance of the second antenna is a second distance, the second distance is less than or equal to the preset secure distance, and the first antenna and the second antenna are different antennas, and a computer program, where the computer program is stored on the memory, and when the computer program is executed by the processor, the electronic device is enabled to perform the following steps, including receiving input, in response to the input, randomly generating a session key, broadcasting a first message through the second antenna, where the first message includes the session key, receiving a second message from the mobile device, and in response to the second message, performing a first action indicated by first action information, or displaying an authentication code. In this way, the electronic device only needs to cooperate with the mobile device. A user determines whether the electronic device performs the first action indicated by the first action information, or whether the electronic device displays the authentication code displayed by the mobile device, so as to determine whether the mobile device has a session with the electronic device. If the mobile device has the session with the electronic device, it indicates that the session is normal, if the mobile device has no session with the electronic device, it indicates that an attack device simulates the electronic device to have a session with the mobile device. In this way, security is improved, and the user only needs to perform a simple operation. This is relatively low in costs and is easy to promote. This solution is applicable to an electronic device with an output capability.

According to a third aspect, an electronic device is provided. The electronic device wirelessly communicates with the mobile device according to any one of the first aspect or the foregoing implementation of the first aspect, and the electronic device includes a processor, a memory, an antenna, where a transmission distance of the antenna at first transmit power is a first distance, and the first distance is greater than a preset secure distance, a transmission distance of the antenna at second transmit power is a second distance, and the second distance is less than or equal to the preset secure distance, and the first transmit power is greater than the second transmit power, and a computer program, where the computer program is stored on the memory, and when the computer program is executed by the processor, the electronic device is enabled to perform the following steps, including receiving input, in response to the input, randomly generating a session key, broadcasting a first message through the antenna at the second transmit power, where the first message includes the session key, receiving a second message from the mobile device, and in response to the second message, performing a first action indicated by first action information, or displaying an authentication code. In this way, the electronic device only needs to cooperate with the mobile device. A user determines whether the electronic device performs the first action indicated by the first action information, or whether the electronic device displays the authentication code displayed by the mobile device, so as to determine whether the mobile device has a session with the electronic device. If the mobile device has the session with the electronic device, it indicates that the session is normal, if the mobile device has no session with the electronic device, it indicates that an attack device simulates the electronic device to have a session with the mobile device. In this way, security is improved, and the user only needs to perform a simple operation. This is relatively low in costs and is easy to promote. This solution is applicable to a device that is an electronic device with an output capability.

According to the third aspect, the first message further includes product identification information of the electronic device. The product identification information is a product identifier (ID).

According to a fourth aspect, an identity authentication method is provided. The identity authentication method is applied to a mobile device. The mobile device wirelessly communicates with an electronic device. The identity authentication method includes receiving a first message of the electronic device within a second distance from the electronic device, where the first message includes a session key randomly generated by the electronic device, randomly generating first action information or an authentication code in response to the first message, and encrypting the first action information or the authentication code by using the session key, to obtain a second message, sending the second message to the electronic device, displaying first confirmation information, where the first confirmation information is used to determine whether the electronic device performs a first action indicated by the first action information, or the first confirmation information is used to determine whether an authentication code prompted by the electronic device is the same as the authentication code displayed by the mobile device, receiving first input for confirmation, and in response to the first input, prompting that identity authentication on the electronic device succeeds, where the second distance is less than or equal to a preset secure distance, and the preset secure distance is a secure distance for exchanging secret information between the mobile device and the electronic device.

According to the fourth aspect, before the displaying first confirmation information, the identity authentication method further includes displaying the first action information or the authentication code.

According to any one of the fourth aspect or the foregoing implementation of the fourth aspect, before or after the sending the second message to the electronic device, the identity authentication method includes displaying the first action information or the authentication code.

According to a fifth aspect, an identity authentication method is provided. The identity authentication method is applied to an electronic device, and the electronic device wirelessly communicates with the mobile device according to any one of the first aspect and the implementations of the first aspect. The electronic device includes a first antenna, where a transmission distance of the first antenna is a first distance, and the first distance is greater than a preset secure distance, and a second antenna, where a transmission distance of the second antenna is a second distance, the second distance is less than or equal to the preset secure distance, and the first antenna and the second antenna are different antennas. The identity authentication method includes receiving input, in response to the input, randomly generating a session key, broadcasting a first message through the second antenna, where the first message includes the session key, receiving a second message from the mobile device, and in response to the second message, performing a first action indicated by first action information, or displaying an authentication code.

According to a sixth aspect, an identity authentication method is provided. The identity authentication method is applied to an electronic device, and the electronic device wirelessly communicates with the mobile device according to any one of the first aspect and the implementations of the first aspect. The electronic device includes an antenna, where a transmission distance of the antenna at first transmit power is a first distance, and the first distance is greater than a preset secure distance, a transmission distance of the antenna at second transmit power is a second distance, and the second distance is less than or equal to the preset secure distance, and the first transmit power is greater than the second transmit power. The identity authentication method includes receiving input, in response to the input, randomly generating a session key, broadcasting a first message through a second antenna, where the first message includes the session key, receiving a second message from the mobile device, and in response to the second message, performing a first action indicated by first action information, or displaying an authentication code.

For technical effects corresponding to any one of the fourth aspect and the implementations of the fourth aspect, and technical effects corresponding to the fifth aspect and the sixth aspect, refer to the technical effects corresponding to any one of the first aspect and the implementation of the first aspect, and technical effects corresponding to the second aspect and the third aspect. Details are not described herein again.

According to a seventh aspect, a mobile device is provided. The mobile device wirelessly communicates with an electronic device. The mobile device includes a processor, a memory, a computer program, where the computer program is stored on the memory, and when the computer program is executed by the processor, the mobile device is enabled to perform the following steps, including receiving a first message of the electronic device within a second distance from the electronic device, where the first message includes a session key randomly generated by the electronic device, displaying first prompt information, where the first prompt information includes first user input information randomly generated by the mobile device, and the first prompt information is used to prompt a user to input the first user input information on the electronic device, receiving a third message of the electronic device within a first distance from the electronic device, where the third message includes second user input information encrypted by using the session key, and after the second user input information is the same as the first user input information, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device. In this way, a user learns of the first user input information displayed on the mobile device, so as to input the first user input information on the electronic device. After detecting the first user input information, the electronic device sends the first user input information to the mobile device in ciphertext form. The mobile device determines whether the first user input information is the same as the first user input information displayed on the mobile device, to determine whether the mobile device has a session with the electronic device. If the mobile device has the session with the electronic device, it indicates that the session is normal, if the mobile device has no session with the electronic device, it indicates that an attack device simulates the electronic device to have a session with the mobile device. In this way, security is improved, and the user only needs to perform a simple operation. This is relatively low in costs and is easy to promote.

According to the seventh aspect, before the displaying first prompt information, the mobile device further performs generating first information, where the first information indicates the electronic device to prepare for receiving user input, encrypting the first information by using the session key, to obtain a second message, and sending the second message to the electronic device.

According to any one of the seventh aspect or the foregoing implementation of the seventh aspect, the mobile device further performs after receiving the third message of the electronic device, obtaining the encrypted second user input information from the third message, and performing decryption by using the session key, to obtain the second user input information.

According to any one of the seventh aspect or the foregoing implementations of the seventh aspect, after the prompting that identity authentication on the electronic device succeeds, the mobile device further performs sending a fourth message to the electronic device, where the fourth message indicates that the authentication succeeds.

According to an eighth aspect, an electronic device is provided. The electronic device wirelessly communicates with the mobile device according to any one of the seventh aspect and the implementations of the seventh aspect. The electronic device includes a processor, a memory, a first antenna, where a transmission distance of the first antenna is a first distance, and the first distance is greater than a preset secure distance, a second antenna, where a transmission distance of the second antenna is a second distance, the second distance is less than or equal to the preset secure distance, and the first antenna and the second antenna are different antennas, and a computer program, where the computer program is stored on the memory, and when the computer program is executed by the processor, the electronic device is enabled to perform the following steps, including receiving input, in response to the input, randomly generating a session key, broadcasting a first message through the second antenna, where the first message includes the session key, receiving second user input, in response to the second user input, encrypting, by using the session key, second user input information corresponding to the second user input, to obtain a third message, and sending the third message to the mobile device through the first antenna. In this way, the electronic device only needs to cooperate with the mobile device. A user learns of first user input information displayed on the mobile device, so as to input the first user input information on the electronic device. After detecting the first user input information, the electronic device sends the first user input information to the mobile device in ciphertext form. The mobile device determines whether the first user input information is the same as the first user input information displayed on the mobile device, to determine whether the mobile device has a session with the electronic device. If the mobile device has the session with the electronic device, it indicates that the session is normal, if the mobile device has no session with the electronic device, it indicates that an attack device simulates the electronic device to have a session with the mobile device. In this way, security is improved, and the user only needs to perform a simple operation. This is relatively low in costs and is easy to promote.

According to the eighth aspect, before the receiving second user input, the electronic device further performs receiving a second message, and in response to the second message, performing decryption by using the session key, to obtain first information.

According to any one of the eighth aspect or the foregoing implementation of the eighth aspect, after the sending the third message to the mobile device through the first antenna, the electronic device further performs receiving a fourth message of the mobile device.

According to a ninth aspect, an electronic device is provided. The electronic device wirelessly communicates with the mobile device according to any one of the seventh aspect and the implementations of the seventh aspect. The electronic device includes a processor, a memory, an antenna, where a transmission distance of the antenna at first transmit power is a first distance, and the first distance is greater than a preset secure distance, a transmission distance of the antenna at second transmit power is a second distance, and the second distance is less than or equal to the preset secure distance, and the first transmit power is greater than the second transmit power, and a computer program, where the computer program is stored on the memory, and when the computer program is executed by the processor, the electronic device is enabled to perform the following steps, including receiving input, in response to the input, randomly generating a session key, broadcasting a first message through the antenna at the second transmit power, where the first message includes the session key, receiving second user input, in response to the second user input, encrypting, by using the session key, second user input information corresponding to the second user input, to obtain a third message, and sending the third message to the mobile device through the antenna at the first transmit power. In this way, the electronic device only needs to cooperate with the mobile device. A user learns of first user input information displayed on the mobile device, so as to input the first user input information on the electronic device. After detecting the first user input information, the electronic device sends the first user input information to the mobile device in ciphertext form. The mobile device determines whether the first user input information is the same as the first user input information displayed on the mobile device, to determine whether the mobile device has a session with the electronic device. If the mobile device has the session with the electronic device, it indicates that the session is normal, if the mobile device has no session with the electronic device, it indicates that an attack device simulates the electronic device to have a session with the mobile device. In this way, security is improved, and the user only needs to perform a simple operation. This is relatively low in costs and is easy to promote.

According to a tenth aspect, an identity authentication method is provided. The identity authentication method is applied to a mobile device. The mobile device wirelessly communicates with an electronic device. The identity authentication method includes receiving a first message of the electronic device within a second distance from the electronic device, where the first message includes a session key randomly generated by the electronic device, displaying first prompt information, where the first prompt information includes first user input information randomly generated by the mobile device, and the first prompt information is used to prompt a user to input the first user input information on the electronic device, receiving a third message of the electronic device within a first distance from the electronic device, where the third message includes second user input information encrypted by using the session key, and after the second user input information is the same as the first user input information, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device.

According to the tenth aspect, before the displaying first prompt information, the identity authentication method further includes generating first information, where the first information indicates the electronic device to prepare for receiving user input, encrypting the first information by using the session key, to obtain a second message, and sending the second message to the electronic device.

According to any one of the tenth aspect or the foregoing implementation of the tenth aspect, the method includes after receiving the third message of the electronic device, obtaining the encrypted second user input information from the third message, and performing decryption by using the session key, to obtain the second user input information.

According to any one of the tenth aspect or the foregoing implementations of the tenth aspect, after the prompting that identity authentication on the electronic device succeeds, the identity authentication method further includes sending a fourth message to the electronic device, where the fourth message indicates that the authentication succeeds.

According to an eleventh aspect, an identity authentication method is provided. The identity authentication method is applied to an electronic device. The electronic device wirelessly communicates with the mobile device according to any one of the seventh aspect and the implementations of the seventh aspect. The electronic device includes a first antenna, where a transmission distance of the first antenna is a first distance, and the first distance is greater than a preset secure distance, and a second antenna, where a transmission distance of the second antenna is a second distance, the second distance is less than or equal to the preset secure distance, and the first antenna and the second antenna are different antennas. The identity authentication method includes receiving input, in response to the input, randomly generating a session key, broadcasting a first message through the second antenna, where the first message includes the session key, receiving second user input, in response to the second user input, encrypting, by using the session key, second user input information corresponding to the second user input, to obtain a third message, and sending the third message to the mobile device through the first antenna.

According to a twelfth aspect, an identity authentication method is provided. The identity authentication method is applied to an electronic device. The electronic device wirelessly communicates with the mobile device according to any one of the seventh aspect and the implementations of the seventh aspect. The electronic device includes an antenna, where a transmission distance of the antenna at first transmit power is a first distance, and the first distance is greater than a preset secure distance, a transmission distance of the antenna at second transmit power is a second distance, and the second distance is less than or equal to the preset secure distance, and the first transmit power is greater than the second transmit power. The identity authentication method includes receiving input, in response to the input, randomly generating a session key, broadcasting a first message through the antenna at the second transmit power, where the first message includes the session key, receiving second user input, in response to the second user input, encrypting, by using the session key, second user input information corresponding to the second user input, to obtain a third message, and sending the third message to the mobile device through the antenna at the first transmit power.

For technical effects corresponding to any one of the tenth aspect and the implementations of the tenth aspect, and technical effects corresponding to the eleventh aspect and the twelfth aspect, refer to the technical effects corresponding to any one of the seventh aspect and the implementation of the seventh aspect, and technical effects corresponding to the eighth aspect and the ninth aspect. Details are not described herein again.

According to a thirteenth aspect, a mobile device is provided. The mobile device wirelessly communicates with an electronic device. The mobile device includes a processor, a memory, a third antenna, where a transmission distance of the third antenna is a third distance, and the third distance is greater than another preset secure distance, a fourth antenna, where a transmission distance of the fourth antenna is a fourth distance, the fourth distance is less than or equal to the another preset secure distance, and the third antenna and the fourth antenna are different antennas, a computer program, where the computer program is stored on the memory, and when the computer program is executed by the processor, the mobile device is enabled to perform the following steps, including receiving a first message of the electronic device within a second distance from the electronic device, where the first message includes a first key randomly generated by the electronic device, in response to the first message, randomly generating a second key, encrypting the second key by using the first key, and combining an encrypted second key and an ID of the mobile device to obtain a second message, sending the second message to the electronic device through the fourth antenna, receiving a third message of the electronic device within a first distance from the electronic device, and in response to the third message, after the third message can be decrypted by using the second key, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device. In this way, a user only needs to move the mobile device nearer to the electronic device, to be specific, tap the mobile device against the electronic device, and the mobile device notifies, through prompting, the user that the identity authentication on the electronic device succeeds. If the mobile device does not perform prompting, it indicates that the identity authentication on the electronic device fails. In this way, security is improved, and the user only needs to perform a simple operation. This is relatively low in costs and is easy to promote.

According to the thirteenth aspect, the ID of the mobile device includes at least one of a medium access control (MAC) address of the mobile device, a serial number (SN) of the mobile device, or a uniform resource identifier (URI) of the mobile device.

According to any one of the thirteenth aspect or the foregoing implementation of the thirteenth aspect, the another preset secure distance is greater than, less than, or equal to the preset secure distance.

According to a fourteenth aspect, a mobile device is provided. The mobile device wirelessly communicates with an electronic device, and the mobile device includes a processor, a memory, another antenna, where a transmission distance of the another antenna at third transmit power is a third distance, and the third distance is greater than another preset secure distance, a transmission distance of the another antenna at fourth transmit power is a fourth distance, and the fourth distance is less than or equal to the another preset secure distance, and the third transmit power is greater than the fourth transmit power, and a computer program, where the computer program is stored on the memory, and when the computer program is executed by the processor, the mobile device is enabled to perform the following steps, including receiving a first message of the electronic device within a second distance from the electronic device, where the first message includes a first key randomly generated by the electronic device, in response to the first message, randomly generating a second key, encrypting the second key by using the first key, and combining an encrypted second key and an ID of the mobile device to obtain a second message, sending the second message to the electronic device through the another antenna at the fourth transmit power, receiving a third message of the electronic device within a first distance from the electronic device, and in response to the third message, after the third message can be decrypted by using the second key, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device. In this way, a user only needs to move the mobile device nearer to the electronic device, to be specific, tap the mobile device against the electronic device, and the mobile device notifies, through prompting, the user that the identity authentication on the electronic device succeeds. If the mobile device does not perform prompting, it indicates that the identity authentication on the electronic device fails. In this way, security is improved, and the user only needs to perform a simple operation. This is relatively low in costs and is easy to promote.

According to a fifteenth aspect, an electronic device is provided. The electronic device wirelessly communicates with the mobile device according to any one of the thirteenth aspect and the implementations of the thirteenth aspect. The electronic device includes a processor, a memory, a first antenna, where a transmission distance of the first antenna is a first distance, and the first distance is greater than a preset secure distance, a second antenna, where a transmission distance of the second antenna is a second distance, the second distance is less than or equal to the preset secure distance, and the first antenna and the second antenna are different antennas, and a computer program, where the computer program is stored on the memory, and when the computer program is executed by the processor, the electronic device is enabled to perform the following steps, including receiving input, in response to the input, randomly generating a first key, broadcasting a first message through the second antenna, where the first message includes the first key, receiving a second message of the mobile device within a fourth distance from the mobile device, in response to the second message, obtaining a second key from the second message, randomly generating one piece of information, and encrypting the information by using the second key, to obtain a third message, and sending the third message to the mobile device through the first antenna. In this way, the electronic device only needs to cooperate with the mobile device. A user only needs to move the mobile device nearer to the electronic device, to be specific, tap the mobile device against the electronic device, and the mobile device notifies, through prompting, the user that the identity authentication on the electronic device succeeds. If the mobile device does not perform prompting, it indicates that the identity authentication on the electronic device fails. In this way, security is improved, and the user only needs to perform a simple operation. This is relatively low in costs and is easy to promote.

According to a sixteenth aspect, an electronic device is provided. The electronic device wirelessly communicates with the mobile device according to any one of the thirteenth aspect and the implementations of the thirteenth aspect. The electronic device includes a processor, a memory, an antenna, where a transmission distance of the antenna at first transmit power is a first distance, and the first distance is greater than a preset secure distance, a transmission distance of the antenna at second transmit power is a second distance, and the second distance is less than or equal to the preset secure distance, and the first transmit power is greater than the second transmit power, and a computer program, where the computer program is stored on the memory, and when the computer program is executed by the processor, the electronic device is enabled to perform the following steps including receiving input, in response to the input, randomly generating a first key, broadcasting a first message through the antenna at the second transmit power, where the first message includes the first key, receiving a second message of the mobile device within a fourth distance from the mobile device, in response to the second message, obtaining a second key from the second message, randomly generating one piece of information, and encrypting the information by using the second key, to obtain a third message, and sending the third message to the mobile device through the antenna at the first transmit power. In this way, the electronic device only needs to cooperate with the mobile device. A user only needs to move the mobile device nearer to the electronic device, to be specific, tap the mobile device against the electronic device, and the mobile device notifies, through prompting, the user that the identity authentication on the electronic device succeeds. If the mobile device does not perform prompting, it indicates that the identity authentication on the electronic device fails. In this way, security is improved, and the user only needs to perform a simple operation. This is relatively low in costs and is easy to promote.

According to a seventeenth aspect, an identity authentication method is provided. The identity authentication method is applied to a mobile device. The mobile device wirelessly communicates with an electronic device. The mobile device includes a third antenna, where a transmission distance of the third antenna is a third distance, and the third distance is greater than another preset secure distance, and a fourth antenna, where a transmission distance of the fourth antenna is a fourth distance, the fourth distance is less than or equal to the another preset secure distance, and the third antenna and the fourth antenna are different antennas. The identity authentication method includes receiving a first message of the electronic device within a second distance from the electronic device, where the first message includes a first key randomly generated by the electronic device, in response to the first message, randomly generating a second key, encrypting the second key by using the first key, and combining an encrypted second key and an ID of the mobile device to obtain a second message, sending the second message to the electronic device through the fourth antenna, receiving a third message of the electronic device within a first distance from the electronic device, and in response to the third message, after the third message can be decrypted by using the second key, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device.

According to an eighteenth aspect, an identity authentication method is provided, and applied to a mobile device. The mobile device wirelessly communicates with an electronic device. The mobile device includes another antenna, where a transmission distance of the another antenna at third transmit power is a third distance, and the third distance is greater than another preset secure distance, a transmission distance of the another antenna at fourth transmit power is a fourth distance, and the fourth distance is less than or equal to the another preset secure distance, and the third transmit power is greater than the fourth transmit power. The identity authentication method includes receiving a first message of the electronic device within a second distance from the electronic device, where the first message includes a first key randomly generated by the electronic device, in response to the first message, randomly generating a second key, encrypting the second key by using the first key, and combining an encrypted second key and an ID of the mobile device to obtain a second message, sending the second message to the electronic device through the another antenna at the fourth transmit power, receiving a third message of the electronic device within a first distance from the electronic device, and in response to the third message, after the third message can be decrypted by using the second key, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device.

According to a nineteenth aspect, an identity authentication method is provided, and applied to an electronic device. The electronic device wirelessly communicates with the mobile device according to any one of the thirteenth aspect and the implementations of the thirteenth aspect. The electronic device includes a first antenna, where a transmission distance of the first antenna is a first distance, and the first distance is greater than a preset secure distance, and a second antenna, where a transmission distance of the second antenna is a second distance, the second distance is less than or equal to the preset secure distance, and the first antenna and the second antenna are different antennas. The identity authentication method includes receiving input, in response to the input, randomly generating a first key, broadcasting a first message through an antenna at second transmit power, where the first message includes the first key, receiving a second message of the mobile device within a fourth distance from the mobile device, in response to the second message, obtaining a second key from the second message, randomly generating one piece of information, and encrypting the information by using the second key, to obtain a third message, and sending the third message to the mobile device through an antenna at first transmit power.

According to a twentieth aspect, an identity authentication method is provided, and applied to an electronic device. The electronic device wirelessly communicates with the mobile device according to any one of the thirteenth aspect and the implementations of the thirteenth aspect. The electronic device includes an antenna, where a transmission distance of the antenna at first transmit power is a first distance, and the first distance is greater than a preset secure distance, a transmission distance of the antenna at second transmit power is a second distance, and the second distance is less than or equal to the preset secure distance, and the first transmit power is greater than the second transmit power. The identity authentication method includes receiving input, in response to the input, randomly generating a first key, broadcasting a first message through the antenna at the second transmit power, where the first message includes the first key, receiving a second message of the mobile device within a fourth distance from the mobile device, in response to the second message, obtaining a second key from the second message, randomly generating one piece of information, and encrypting the information by using the second key, to obtain a third message, and sending the third message to the mobile device through the antenna at the first transmit power.

For technical effects corresponding to the seventeenth aspect, the eighteenth aspect, the nineteenth aspect, and the twentieth aspect, refer to the technical effects corresponding to the thirteenth aspect, the fourteenth aspect, the fifteenth aspect, and the sixteenth aspect. Details are not described herein again.

According to a twenty-first aspect, a mobile device is provided. The mobile device wirelessly communicates with an electronic device. The mobile device includes a processor, a memory, a third antenna, where a transmission distance of the third antenna is a third distance, and the third distance is greater than another preset secure distance, a fourth antenna, where a transmission distance of the fourth antenna is a fourth distance, the fourth distance is less than or equal to the another preset secure distance, and the third antenna and the fourth antenna are different antennas, and a computer program, where the computer program is stored on the memory, and when the computer program is executed by the processor, the mobile device is enabled to perform the following steps, including receiving a first message of the electronic device within a second distance from the electronic device, where the first message includes a first key randomly generated by the electronic device, in response to the first message, randomly generating a second key, sending a second message to the electronic device through the fourth antenna, where the second message includes the second key and an ID of the mobile device, obtaining a third key through derivation based on the first key and the second key by using a first preset algorithm, receiving a third message of the electronic device within a first distance from the electronic device, and in response to the third message, after the third message can be decrypted by using the third key, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device. In this way, a user only needs to move the mobile device nearer to the electronic device, to be specific, tap the mobile device against the electronic device, and the mobile device notifies, through prompting, the user that the identity authentication on the electronic device succeeds. If the mobile device does not perform prompting, it indicates that the identity authentication on the electronic device fails. In this way, security is improved, and the user only needs to perform a simple operation. This is relatively low in costs and is easy to promote.

According to the twenty-first aspect, the ID of the mobile device includes a MAC address of the mobile device.

According to a twenty-second aspect, a mobile device is provided. The mobile device wirelessly communicates with an electronic device. The mobile device includes a processor, a memory, another antenna, where a transmission distance of the another antenna at third transmit power is a third distance, and the third distance is greater than another preset secure distance, a transmission distance of the another antenna at fourth transmit power is a fourth distance, and the fourth distance is less than or equal to the another preset secure distance, and the third transmit power is greater than the fourth transmit power, and a computer program, where the computer program is stored on the memory, and when the computer program is executed by the processor, the mobile device is enabled to perform the following steps, including receiving a first message of the electronic device within a second distance from the electronic device, where the first message includes a first key randomly generated by the electronic device, in response to the first message, randomly generating a second key, sending a second message to the electronic device through the another antenna at the fourth transmit power, where the second message includes the second key and an ID of the mobile device, obtaining a third key through derivation based on the first key and the second key by using a first preset algorithm, receiving a third message of the electronic device within a first distance from the electronic device, and in response to the third message, after the third message can be decrypted by using the third key, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device. In this way, a user only needs to move the mobile device nearer to the electronic device, to be specific, tap the mobile device against the electronic device, and the mobile device notifies, through prompting, the user that the identity authentication on the electronic device succeeds. If the mobile device does not perform prompting, it indicates that the identity authentication on the electronic device fails. In this way, security is improved, and the user only needs to perform a simple operation. This is relatively low in costs and is easy to promote.

According to a twenty-third aspect, an electronic device is provided. The electronic device wirelessly communicates with the mobile device according to any one of the twenty-first aspect and the implementation of the twenty-first aspect, and the twenty-second aspect. The electronic device includes a processor, a memory, a first antenna, where a transmission distance of the first antenna is a first distance, and the first distance is greater than a preset secure distance, a second antenna, where a transmission distance of the second antenna is a second distance, the second distance is less than or equal to the preset secure distance, and the first antenna and the second antenna are different antennas, and a computer program, where the computer program is stored on the memory, and when the computer program is executed by the processor, the electronic device is enabled to perform the following steps, including receiving input, in response to the input, randomly generating a first key, broadcasting a first message through the second antenna, where the first message includes the first key, receiving a second message of the mobile device within a fourth distance from the mobile device, in response to the second message, obtaining a second key from the second message, obtaining a third key through derivation based on the first key and the second key by using a first preset algorithm, randomly generating one piece of information, and encrypting the information by using the third key, to obtain a third message, and sending the third message to the mobile device through the first antenna. In this way, a user only needs to move the mobile device nearer to the electronic device, to be specific, tap the mobile device against the electronic device, and the mobile device notifies, through prompting, the user that the identity authentication on the electronic device succeeds. If the mobile device does not perform prompting, it indicates that the identity authentication on the electronic device fails. In this way, security is improved, and the user only needs to perform a simple operation. This is relatively low in costs and is easy to promote.

According to a twenty-fourth aspect, an electronic device is provided. The electronic device wirelessly communicates with the mobile device according to any one of the twenty-first aspect and the implementation of the twenty-first aspect, and the twenty-second aspect. The electronic device includes a processor, a memory, an antenna, where a transmission distance of the antenna at first transmit power is a first distance, and the first distance is greater than a preset secure distance, a transmission distance of the antenna at second transmit power is a second distance, and the second distance is less than or equal to the preset secure distance, and the first transmit power is greater than the second transmit power, and a computer program, where the computer program is stored on the memory, and when the computer program is executed by the processor, the electronic device is enabled to perform the following steps, including receiving input, in response to the input, randomly generating a first key, broadcasting a first message through the antenna at the second transmit power, where the first message includes the first key, receiving a second message of the mobile device within a fourth distance from the mobile device, in response to the second message, obtaining a second key from the second message, obtaining a third key through derivation based on the first key and the second key by using a first preset algorithm, randomly generating one piece of information, and encrypting the information by using the third key, to obtain a third message, and sending the third message to the mobile device through the antenna at the first transmit power. In this way, a user only needs to move the mobile device nearer to the electronic device, to be specific, tap the mobile device against the electronic device, and the mobile device notifies, through prompting, the user that the identity authentication on the electronic device succeeds. If the mobile device does not perform prompting, it indicates that the identity authentication on the electronic device fails. In this way, security is improved, and the user only needs to perform a simple operation. This is relatively low in costs and is easy to promote.

According to a twenty-fifth aspect, an identity authentication method is provided, and applied to a mobile device. The mobile device wirelessly communicates with an electronic device. The mobile device includes a third antenna, where a transmission distance of the third antenna is a third distance, and the third distance is greater than another preset secure distance, and a fourth antenna, where a transmission distance of the fourth antenna is a fourth distance, the fourth distance is less than or equal to the another preset secure distance, and the third antenna and the fourth antenna are different antennas. The method includes receiving a first message of the electronic device within a second distance from the electronic device, where the first message includes a first key randomly generated by the electronic device, in response to the first message, randomly generating a second key, sending a second message to the electronic device through the fourth antenna, where the second message includes the second key and an ID of the mobile device, obtaining a third key through derivation based on the first key and the second key by using a first preset algorithm, receiving a third message of the electronic device within a first distance from the electronic device, and in response to the third message, after the third message can be decrypted by using the third key, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device.

According to a twenty-sixth aspect, an identity authentication method is provided, and applied to a mobile device. The mobile device wirelessly communicates with an electronic device. The mobile device includes another antenna, where a transmission distance of the another antenna at third transmit power is a third distance, and the third distance is greater than another preset secure distance, a transmission distance of the another antenna at fourth transmit power is a fourth distance, and the fourth distance is less than or equal to the another preset secure distance, and the third transmit power is greater than the fourth transmit power. The method includes receiving a first message of the electronic device within a second distance from the electronic device, where the first message includes a first key randomly generated by the electronic device, in response to the first message, randomly generating a second key, sending a second message to the electronic device through the another antenna at the fourth transmit power, where the second message includes the second key and an ID of the mobile device, obtaining a third key through derivation based on the first key and the second key by using a first preset algorithm, receiving a third message of the electronic device within a first distance from the electronic device, and in response to the third message, after the third message can be decrypted by using the third key, prompting that identity authentication on the electronic device succeeds, where the second distance is less than or equal to a preset secure distance, the first distance is greater than the preset secure distance, and the preset secure distance is a secure distance for exchanging secret information between the mobile device and the electronic device.

According to a twenty-seventh aspect, an identity authentication method is provided, and applied to an electronic device. The electronic device wirelessly communicates with the mobile device according to any one of the twenty-first aspect and the implementation of the twenty-first aspect, and the twenty-second aspect. The electronic device includes a first antenna, where a transmission distance of the first antenna is a first distance, and the first distance is greater than a preset secure distance, and a second antenna, where a transmission distance of the second antenna is a second distance, the second distance is less than or equal to the preset secure distance, and the first antenna and the second antenna are different antennas. The method includes receiving input, in response to the input, randomly generating a first key, broadcasting a first message through the second antenna, where the first message includes the first key, receiving a second message of the mobile device within a fourth distance from the mobile device, in response to the second message, obtaining a second key from the second message, obtaining a third key through derivation based on the first key and the second key by using a first preset algorithm, randomly generating one piece of information, and encrypting the information by using the third key, to obtain a third message, and sending the third message to the mobile device through the first antenna.

According to a twenty-eighth aspect, an identity authentication method is provided, and applied to an electronic device. The electronic device wirelessly communicates with the mobile device according to any one of the twenty-first aspect and the implementation of the twenty-first aspect, and the twenty-second aspect. The electronic device includes an antenna, where a transmission distance of the antenna at first transmit power is a first distance, and the first distance is greater than a preset secure distance, a transmission distance of the antenna at second transmit power is a second distance, and the second distance is less than or equal to the preset secure distance, and the first transmit power is greater than the second transmit power. The method includes receiving input, in response to the input, randomly generating a first key, broadcasting a first message through the antenna at the second transmit power, where the first message includes the first key, receiving a second message of the mobile device within a fourth distance from the mobile device, in response to the second message, obtaining a second key from the second message, obtaining a third key through derivation based on the first key and the second key by using a first preset algorithm, randomly generating one piece of information, and encrypting the information by using the third key, to obtain a third message, and sending the third message to the mobile device through the antenna at the first transmit power.

For technical effects corresponding to the twenty-fifth aspect, the twenty-sixth aspect, the twenty-seventh aspect, and the twenty-eighth aspect, refer to the technical effects corresponding to the twenty-first aspect, the twenty-second aspect, the twenty-third aspect, and the twenty-fourth aspect. Details are not described herein again.

According to a twenty-ninth aspect, a computer-readable storage medium is provided. The computer-readable storage medium includes a computer program. When the computer program is run on a mobile device, the mobile device is enabled to perform the method according to any one of the fourth aspect and the implementations of the fourth aspect, any one of the tenth aspect and the implementations of the tenth aspect, the seventeenth aspect, the eighteenth aspect, the twenty-fifth aspect, or the twenty-sixth aspect.

For technical effects corresponding to any one of the twenty-ninth aspect and the implementations of the twenty-ninth aspect, refer to technical effects corresponding to any one of the fourth aspect and the implementations of the fourth aspect, any one of the tenth aspect and the possible implementations of the tenth aspect, the seventeenth aspect, the eighteenth aspect, the twenty-fifth aspect, or the twenty-sixth aspect. Details are not described herein again.

According to a thirtieth aspect, a computer-readable storage medium is provided. The computer-readable storage medium includes a computer program. When the computer program is run on an electronic device, the electronic device is enabled to perform the method according to the fifth aspect, the sixth aspect, the eleventh aspect, the twelfth aspect, the nineteenth aspect, the twentieth aspect, the twenty-seventh aspect, or the twenty-eighth aspect.

For technical effects corresponding to any one of the thirtieth aspect and the implementations of the thirtieth aspect, refer to technical effects corresponding to the fifth aspect, the sixth aspect, the eleventh aspect, the twelfth aspect, the nineteenth aspect, the twentieth aspect, the twenty-seventh aspect, or the twenty-eighth aspect. Details are not described herein again.

According to a thirty-first aspect, a computer program product is provided. When the computer program product is run on a computer, the computer is enabled to perform the method according to any one of the fourth aspect and the implementations of the fourth aspect, any one of the tenth aspect and the implementations of the tenth aspect, the seventeenth aspect, the eighteenth aspect, the twenty-fifth aspect, or the twenty-sixth aspect.

For technical effects corresponding to any one of the thirty-first aspect and the implementations of the thirty-first aspect, refer to technical effects corresponding to any one of the fourth aspect and the implementations of the fourth aspect, any one of the tenth aspect and the implementations of the tenth aspect, the seventeenth aspect, the eighteenth aspect, the twenty-fifth aspect, or the twenty-sixth aspect. Details are not described herein again.

According to a thirty-second aspect, a computer program product is provided. When the computer program product is run on a computer, the computer is enabled to perform the method according to the fifth aspect, the sixth aspect, the eleventh aspect, the twelfth aspect, the nineteenth aspect, the twentieth aspect, the twenty-seventh aspect, or the twenty-eighth aspect.

For technical effects corresponding to any one of the thirty-second aspect and the implementations of the thirty-second aspect, refer to technical effects corresponding to the fifth aspect, the sixth aspect, the eleventh aspect, the twelfth aspect, the nineteenth aspect, the twentieth aspect, the twenty-seventh aspect, or the twenty-eighth aspect. Details are not described herein again.

DETAILED DESCRIPTION OF ILLUSTRATIVE EMBODIMENTS

Figure 1:
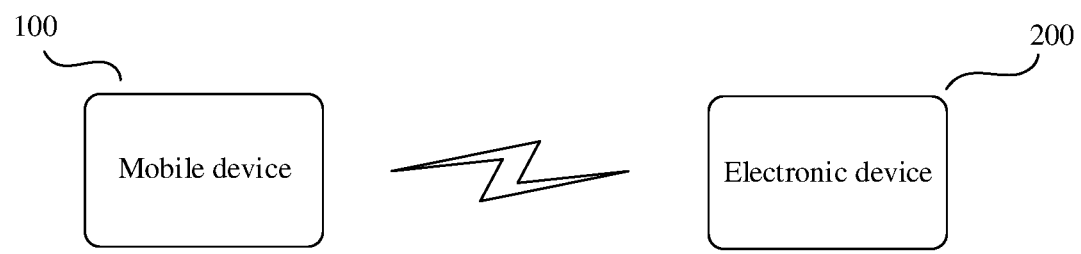
FIG. 1 is a schematic scenario diagram of an identity authentication method according to an embodiment of this application.

The following describes the technical solutions in embodiments of this application with reference to the accompanying drawings in embodiments of this application. In descriptions of embodiments of this application, terms used in the following embodiments are merely intended to describe purposes of specific embodiments, but are not intended to limit this application. The terms "one", "a" and "this" of singular forms used in this specification and the appended claims of this application are also intended to include expressions such as "one or more", unless otherwise specified in the context clearly. It should be further understood that in the following embodiments of this application, "at least one" and "one or more" refer to one or more (including two). The term "and/or" is used to describe an association relationship between associated objects and represents that three relationships may exist. For example, A and/or B may represent the following cases: Only A exists, both A and B exist, and only B exists, where A and B each may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner. The term "connection" includes a direct connection and an indirect connection, unless otherwise indicated. "First" and "second" are merely intended for a purpose of description, and shall not be understood as an indication or implication of relative importance or implicit indication of the number of indicated technical features.

In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the word "example", "for example", or the like is intended to present a relative concept in a specific manner.

A mobile device installed with an application (application, App) can quickly and conveniently control an electronic device, and is widely used. However, before controlling the electronic device, the mobile device needs to authenticate an identity of the electronic device. Specifically, the mobile device needs to ensure that the electronic device to be controlled is consistent with an electronic device displayed on the mobile device. Therefore, how to provide a high-security identity authentication method that has low costs and that is easy to promote becomes a requirement.

To resolve the foregoing technical problem, this application provides an identity authentication method, an electronic device, and a computer-readable storage medium, so as to ensure high security, facilitate a user operation, improve user experience, reduce costs, and facilitate promotion.

FIG. 1 is a schematic scenario diagram of an identity authentication method according to an embodiment of this application. As shown in FIG. 1, an electronic device 200 broadcasts a message in a plaintext form within a relatively short distance according to a specific rule. Because the broadcasting is performed is within the relatively short distance, communication is relatively safe. The message usually includes a key and product identification information (Product ID) of the electronic device 200. Within the relatively short distance from the electronic device 200, a mobile device 100 receives the message, and obtains the key and the product ID of the electronic device 200. Subsequently, the mobile device 100 may be away from the electronic device 200, encrypt related information by using the key, generate a message, and send the message to the electronic device. The electronic device may decrypt the message by using the key, to obtain the related information of the mobile device, so as to perform a related operation. In this case, the message is in ciphertext, and other devices do not have the key and cannot decrypt the message. This ensures communication security. In this way, although the electronic device sends a message in a plaintext manner within a short distance, a short-distance communication distance is a secure distance. Within a long distance, a ciphertext is transmitted during communication between the mobile device and the electronic device. Therefore, communication security between the mobile device and the electronic device is ensured regardless of within the short distance or within the long distance.

In embodiments of this application, the mobile device includes but is not limited to a smartphone, a smart headset, a tablet computer, and a wearable electronic device (like a smartwatch, a smart band, a smart ring, and smart glasses) with a wireless communication function. An example embodiment of the mobile device includes, but is not limited to, a portable electronic device on which iOS®, Android®, Harmony®, Windows, Linux, or another operating system is installed. The mobile device may alternatively be another portable electronic device, like a laptop. It should be further understood that in some other embodiments, the mobile device may not be a portable electronic device, but a desktop computer.

Figure 2:
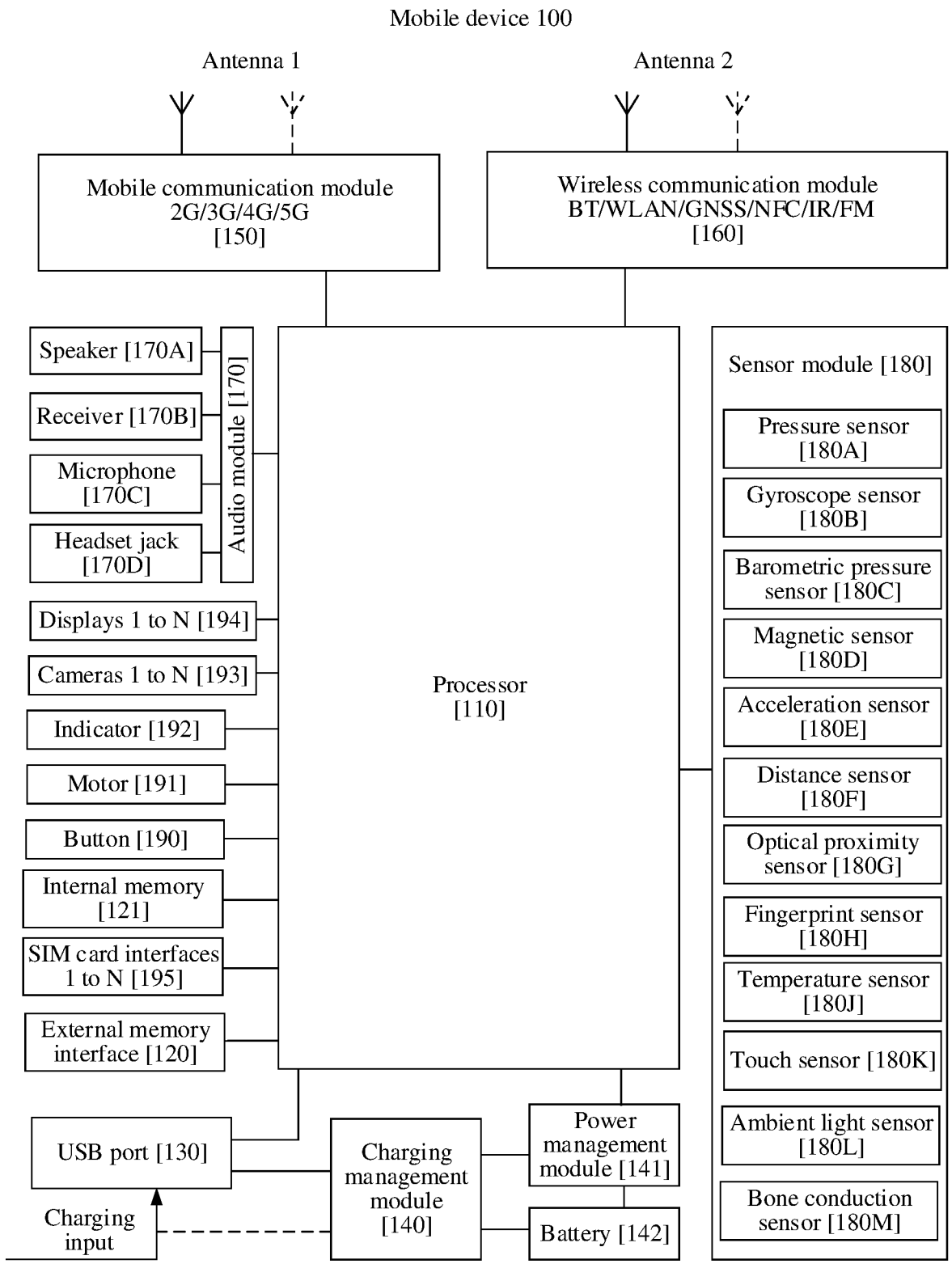
FIG. 2 is a schematic diagram of a hardware structure of a mobile device according to an embodiment of this application.

For example, FIG. 2 is a schematic diagram of a hardware structure of the mobile device 100 according to an embodiment of this application. As shown in FIG. 2, the mobile device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the mobile device 100. In some other embodiments of this application, the mobile device 100 may include more or fewer components than those shown in the figure, or combine some components, or split some components, or have different component arrangements. The components shown in the figure may be implemented by hardware, software, or a combination of software and hardware.

The charging management module 140 is configured to receive charging input from a charger. The power management module 141 is configured to connect to the battery 142, the charging management module 140, and the processor 110. A wireless communication function of the mobile device 100 may be implemented by using the antenna 1, the antenna 2, the mobile communication module iso, the wireless communication module 160, the modem processor, the baseband processor, and the like.

The antenna 1 and the antenna 2 are configured to transmit and receive an electromagnetic wave signal. Each antenna in the mobile device 100 may be configured to cover one or more communication bands. Different antennas may be further reused, to improve antenna utilization. For example, the antenna 1 may be reused as a diversity antenna of a wireless local area network. In some other embodiments, the antenna may be used in combination with a tuning switch.

The mobile communication module 150 can provide a solution, applied to the mobile device 100, for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor no.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to an application processor. The application processor outputs a sound signal via an audio device (which is not limited to the loudspeaker 170A, the receiver 170B, or the like), or displays an image or a video via the display 194. In some embodiments, the modem processor may be an independent component. In some other embodiments, the modem processor may be independent of the processor 110, and is disposed in a same component as the mobile communication module 150 or another functional module.

The wireless communication module 160 may provide a solution, applied to the mobile device 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the mobile device 100, the antenna 1 is coupled to the mobile communication module iso, and the antenna 2 is coupled to the wireless communication module 160, so that the mobile device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile device 100 may implement a photographing function via an ISP, the camera 193, a video codec, a GPU, the display 194, the application processor, and the like.

The external memory interface 120 may be configured to connect to an external storage card, for example, a micro SD card, to extend a storage capability of the mobile device 100. The external storage card communicates with the processor no through the external memory interface 120, to implement a data storage function. For example, files such as music and videos are stored in the external storage card.

The mobile device 100 may implement an audio function like a music playback function and a recording function via the audio module 170, the speaker 170A, the receiver 170B, the microphone 170C, the headset jack 170D, the application processor, and the like.

Figure 3:
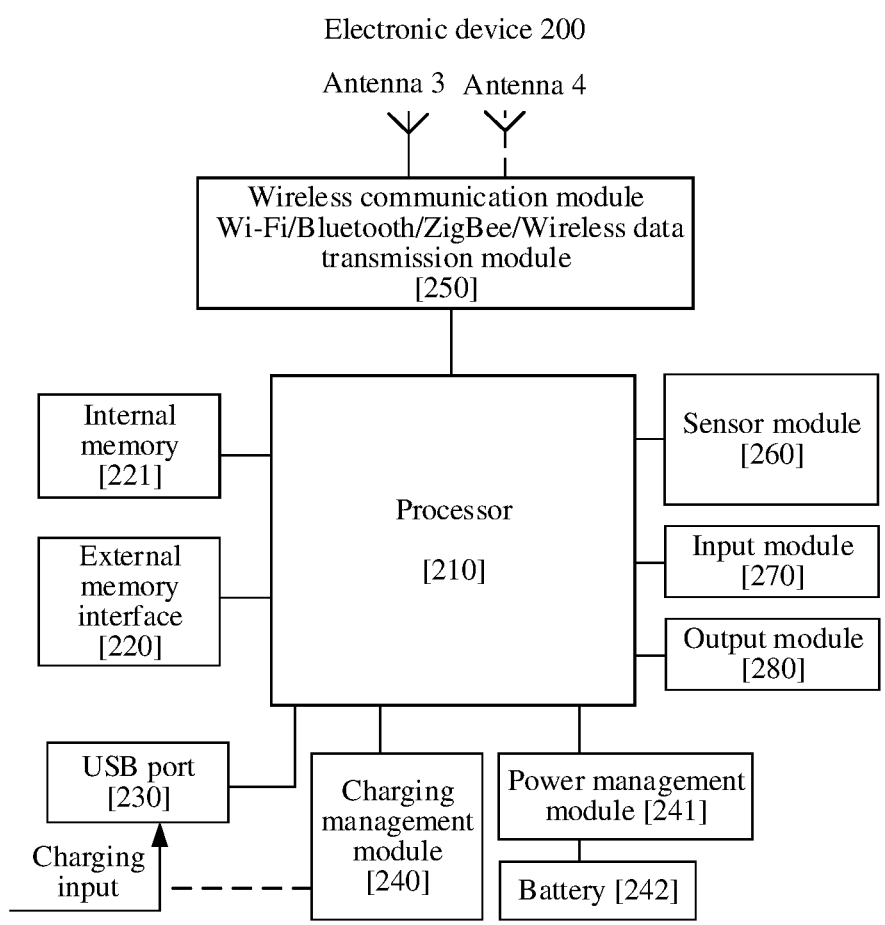
FIG. 3 is a schematic diagram of a hardware structure of an electronic device according to an embodiment of this application.

For example, FIG. 3 is a schematic diagram of a hardware structure of the electronic device 200 according to an embodiment of this application. The electronic device 200 may include a processor 210, an external memory interface 220, an internal memory 221, a universal serial bus (USB) port 230, a charging management module 240, a power management module 241, a battery 242, an antenna 3, an antenna 4, a wireless communication module 250, a sensor module 260, an input module 270, an output module 280, and the like.

It can be understood that the structure shown in this embodiment of this application does not constitute a specific limitation on the electronic device 200. In some other embodiments of this application, the electronic device 200 may include more or fewer components than those shown in the figure, or combine some components, or split some components, or have different component arrangements. The components shown in the figure may be implemented by hardware, software, or a combination of software and hardware. For example, the electronic device 200 may be a smart lamp, a smart television, a smart speaker, or the like.

The processor 210 may include one or more processing units. For example, the processor 210 may include an application processor (AP), a modem processor, a graphics processing unit (GPU), an image signal processor (ISP), a controller, a video codec, a digital signal processor (DSP), a baseband processor, and/or a neural network processor (NPU). Different processing units may be independent components, or may be integrated into one or more processors. In some embodiments, the electronic device 200 may alternatively include one or more processors 210. The controller may generate an operation control signal based on instruction operation code and a time sequence signal, to complete control of instruction reading and instruction execution.

In some embodiments, the processor 210 may include one or more interfaces. The interface may include an inter-integrated circuit (I2C) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB port, and/or the like. The USB port 230 is a port that conforms to a USB standard specification, and may be specifically a Mini USB port, a Micro USB port, a USB Type C port, or the like. The USB port 230 may be configured to connect to a charger for charging the electronic device 200, or may be configured to transmit data between the electronic device 200 and a peripheral device.

It can be understood that an interface connection relationship between the modules shown in this embodiment of this application is merely an example for description, and does not constitute a limitation on the structure of the electronic device 200. In some other embodiments of this application, the electronic device 200 may alternatively use an interface connection manner different from that in the foregoing embodiment, or a combination of a plurality of interface connection manners.

The charging management module 240 is configured to receive charging input from a charger. The charger may be a wireless charger or a wired charger. In some embodiments of wired charging, the charging management module 240 may receive charging input of a wired charger through the USB port 230. In some embodiments of wireless charging, the charging management module 240 may receive wireless charging input via a wireless charging coil of the electronic device 200. The charging management module 240 may further supply power to the electronic device via the power management module 241 while charging the battery 242.

The power management module 241 is configured to connect to the battery 242, the charging management module 240, and the processor 210. The power management module 241 receives input of the battery 242 and/or the charging management module 240, to supply power to the processor 210, the internal memory 221, the external memory interface 220, the wireless communication module 250, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some other embodiments, the power management module 241 and the charging management module 240 may alternatively be disposed in a same component.

A wireless communication function of the electronic device 200 may be implemented by using the antenna 3, the antenna 4, the wireless communication module 250, and the like.

The wireless communication module 250 may provide a wireless communication solution applied to the electronic device 200, and the wireless communication solution includes Wi-Fi, Bluetooth (BT), a wireless data transmission module (for example, 433 MHz, 868 MHz, or 915 MHz), and the like. The wireless communication module 250 may be one or more components integrating at least one communication processor module. The wireless communication module 250 receives an electromagnetic wave through the antenna 3 or the antenna 4, performs filtering and frequency modulation processing on the electromagnetic wave signal, and sends a processed signal to the processor 210. The wireless communication module 250 may further receive a to-be-sent signal from the processor 210, perform frequency modulation and amplification on the signal, and convert the signal into an electromagnetic wave for radiation through the antenna 3 or the antenna 4.

In this embodiment of this application, the electronic device 200 may send a broadcast message via a wireless communication module. The broadcast message may carry a device identifier or a product identifier of the electronic device 200, and is used by another surrounding electronic device to discover the electronic device 200. The electronic device 200 may further receive, via the wireless communication module, a message sent by another electronic device.

The external memory interface 220 may be configured to connect to an external memory card, for example, a micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store one or more computer programs, and the one or more computer programs include instructions. The processor 210 may run the instructions stored in the internal memory 221, so that the electronic device 200 performs an identity authentication method provided in some embodiments of this application, various applications, data processing, and the like. The internal memory 221 may include a code storage area and a data storage area. The code storage area may store an operating system. The data storage area may store data created during use of the electronic device 200, and the like. In addition, the internal memory 221 may include a high-speed random access memory, or may include a nonvolatile memory, for example, one or more magnetic disk storage devices, a flash memory device, or a universal flash storage (UFS). In some embodiments, the processor 210 may run the instructions stored in the internal memory 221 and/or the instructions stored in the memory that is disposed in the processor 210, to enable the electronic device 200 to perform the identity authentication method provided in embodiments of this application, other applications, and data processing.

The input module 270 includes but is not limited to a keyboard, a touchscreen (or a touch display), a mouse, a camera, a laser pen, a handwriting input board, a microphone, and the like. The microphone includes a single microphone and also includes a microphone array.

The output module 280 includes but is not limited to a display, an LED light, a loudspeaker, an earphone, a motor that generates vibration and an auxiliary component thereof, a heat emitting component that generates heat, and the like.

The electronic device 200 includes but is not limited to a tablet computer, a desktop computer, a portable electronic device (for example, a laptop computer), a smart television (for example, a smart screen), a vehicle-mounted computer, a smart speaker, an augmented reality (AR) device, a virtual reality (VR) device, another smart device with a display, another smart device with a speaker, and the like. An example embodiment of an electronic device includes but is not limited to a portable or non-portable electronic device on which iOS®, Android®, Harmony®, Windows®, Linux, or another operating system is installed.

In this embodiment of this application, a wireless communication manner between the mobile device and the electronic device includes but is not limited to BLE (bluetooth low-energy), Wi-Fi aware and ZigBee. The wireless communication manner like BLE and Wi-Fi aware is interaction performed based on a medium access control (MAC) layer of a computer network, also referred to as interaction performed based on data link layer protocol extension, and does not need to involve upper-layer network communication at the MAC layer, and data interaction can be completely implemented at a data link layer. The BLE is an ultra-low power consumption near field wireless communication solution that is launched by a Bluetooth Special Interest Group in 2016 and that is applied to an electronic device, and may implement communication at the MAC layer. Wi-Fi Aware (Wi-Fi neighborhood awareness networking, Wi-Fi neighborhood awareness networking (NAN)) is a new low-power consumption Wi-Fi Mesh communication technology with point-to-point interconnection and interworking. The technology can bypass a network infrastructure (like an access point (AP) or a cellular network), to implement one-to-one, one-to-many, or many-to-many connection communication between devices, and implement communication at the MAC layer. As shown in FIG. 4, the mobile device 100 may specifically complete communication with the electronic device 200 in the wireless communication manner like BLE or Wi-Fi aware. It should be noted that the wireless communication manner is different from a common Wi-Fi connection or Bluetooth connection. Specifically, in the wireless communication manner like BLE or Wi-Fi aware, the data interaction may be directly implemented at the MAC layer of a computer network by sending a beacon frame, without a need to involve data interaction at a network layer that is higher than the MAC layer in the computer network. Communication between devices implemented in the wireless communication manner like BLE or Wi-Fi aware not only can improve communication efficiency (where the mobile device 100 does not need to complete steps such as Wi-Fi or Bluetooth connection and user identity login verification with the electronic device 200, and does not need to involve content such as a network protocol of an upper-layer network), but also can improve security of the data interaction (the data transmission at the MAC layer).

Figure 4A:
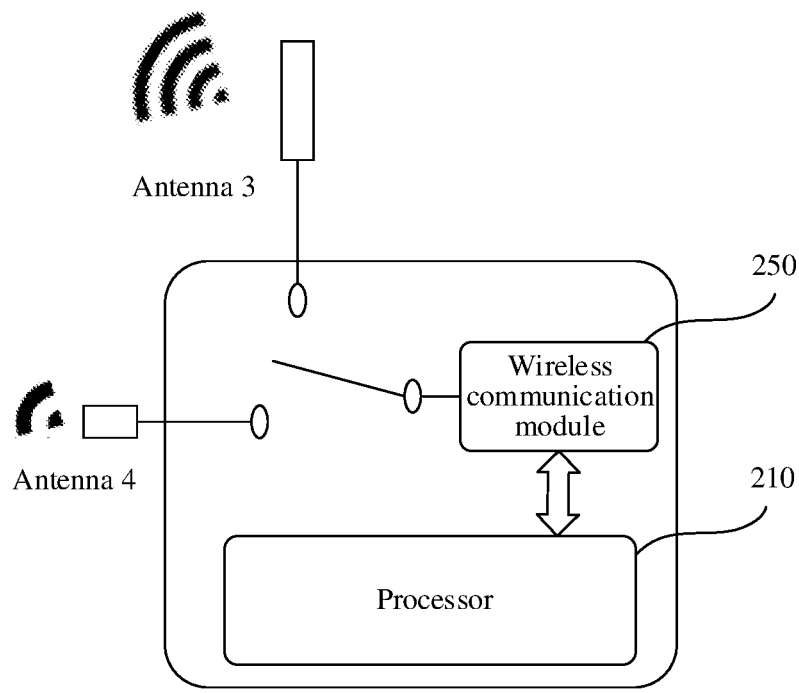
FIG. 4A is a schematic diagram of a principle of an ultra-short range wireless communication module and an antenna according to an embodiment of this application.

In an example, FIG. 4A shows a principle structure of an ultra-short range wireless communication module and an antenna according to an embodiment of this application. As shown in FIG. 4A, the electronic device 200 may include the processor 210, the wireless communication module 250, the antenna 3, and the antenna 4.

The antenna 3 (also referred to as a first antenna, like a strong antenna) and the antenna 4 (also referred to as a second antenna, like a weak antenna) are configured to transmit and receive electromagnetic waves. Further, the wireless communication module 250 converts an electromagnetic wave received from the antenna 3 or the antenna 4 into a signal, and sends the signal to the processor 210 for processing, or the wireless communication module 250 receives a to-be-sent signal from the processor 210, and converts the to-be-sent signal into an electromagnetic wave for radiation through the strong antenna or the weak antenna. In this embodiment of this application, a first transmission distance (for example, 10 meters or 5 meters, which may be specifically set by a user) for transmitting a signal through the strong antenna is greater than a second transmission distance (for example, 0.2 meter or 0.3 meter, which may be specifically set by the user) for transmitting a signal through the weak antenna. The second transmission distance for transmitting a signal through the weak antenna is less than or equal to a preset secure distance, where the preset secure distance is a distance at which the user of the electronic device 200 exchanges secret information with the electronic device 200 via the mobile device 100. In an example, the preset secure distance is a secure distance at which the user of the electronic device 200 exchanges the secret information with the electronic device 200 via the mobile device 100. For example, the preset secure distance may be 50 cm, 40 cm, 30 cm, 20 cm, or the like. In this way, the secret information sent by the electronic device 200 can be received only when a distance between the mobile device 100 and the electronic device 200 is less than or equal to the preset secure distance. In this way, a security risk is reduced (for example, the secret information is not received by another device 50 cm away from the electronic device 200). The user of the mobile device 100 may move the mobile device 100 nearer and enter the preset secure distance of the electronic device 200 only when the surroundings are secure, so that security is improved. In some embodiments, the processor 210 may control switching between the strong antenna and the weak antenna. When the electronic device 200 uses the strong antenna, the mobile device 100 receives a signal sent by the electronic device 200 only when the distance between the mobile device 100 and the electronic device 200 is less than the first transmission distance. When the electronic device 200 uses the weak antenna, the mobile device receives a signal sent by the electronic device 200 only when the distance between the mobile device 100 and the electronic device 200 is less than the second transmission distance. The first transmission distance is greater than the preset secure distance, and the second transmission distance is less than or equal to the preset secure distance. In some embodiments, the first transmission distance and the second transmission distance may be respectively referred to as a first distance and a second distance.

Figure 4B:
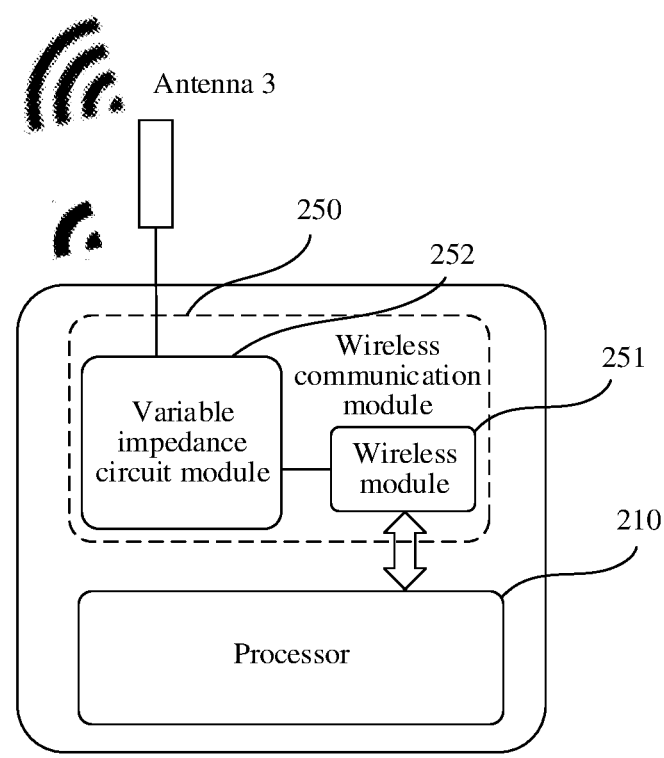
FIG. 4B is a schematic diagram of a principle of an ultra-short range wireless communication module and an antenna according to an embodiment of this application.

In another example, FIG. 4B shows another principle structure of an ultra-short range wireless communication module and an antenna according to an embodiment of this application. As shown in FIG. 4B, the electronic device 200 may include the processor 210, the wireless communication module 250, and the antenna 3. The wireless communication module 250 includes a wireless module 251 and a variable impedance circuit module 252. The antenna 3 is configured to transmit and receive a radio signal. The variable impedance circuit module 252 may be a circuit, an integrated line, or the like, including a variable impedance. The processor 210 adjusts, by controlling and adjusting a resistance value of the variable impedance circuit module 252, transmit power loaded on the antenna 3, so as to control a transmission distance for transmitting a radio signal through the antenna 3. For example, when the resistance value of the variable impedance circuit module 252 is a first resistance value, the transmit power of the antenna 3 is first transmit power. In this case, the distance for transmitting the radio signal through the antenna 3 is a first transmission distance (where a function of a strong antenna is implemented). When the resistance value of the variable impedance circuit module 252 is a second resistance value, the transmit power of the antenna 3 is second transmit power. In this case, the distance for transmitting the radio signal through the antenna 3 is a second transmission distance (where a function of a weak antenna is implemented). The first transmit power is greater than the second transmit power, the first transmission distance is greater than a preset secure distance, and the second transmission distance is less than or equal to the preset secure distance. In some embodiments, the first transmission distance and the second transmission distance may be respectively referred to as a first distance and a second distance. In another example corresponding to FIG. 4B, other descriptions about the processor 210 and the wireless communication module 250 are the same as related descriptions in an example corresponding to FIG. 4A. Details are not described herein again.

It should be noted that, although structures of the ultra-short range wireless communication module and the antenna in FIG. 4A and FIG. 4B are described by using the electronic device 200 as an example, the mobile device 100 may also include the structures of the ultra-short range wireless communication module and the antenna. For example, according to the reference numerals in FIG. 4A, the mobile device 100 may include the processor no, the wireless communication module 160, the antenna 2, and an antenna 5 (the antenna 5 is not shown in FIG. 2, and the antenna 5 is also connected to the wireless communication module 160). According to the reference numerals in FIG. 4B, the mobile device 100 may include the processor no, the wireless communication module 160, and the antenna 2. Specific descriptions are the same as or similar to the descriptions related to FIG. 4A and FIG. 4B, and details are not described herein again.

It may be understood that principle structures shown in the example corresponding to FIG. 4A and the another example corresponding to FIG. 4B do not constitute a specific limitation on the wireless communication module and the antenna in the electronic device 200. In some other embodiments, structures of the wireless communication module and the antenna in the electronic device 200 may include more or fewer components than those shown in the figure, or some components may be combined, or some components may be split, or different component arrangements may be used. The components shown in the figure may be implemented by hardware, software, or a combination of software and hardware. Correspondingly, the foregoing content is also applicable to the structures of the ultra-short range wireless communication module and the antenna of the mobile device 100. Details are not described herein again.

In some embodiments, the strong antenna and the weak antenna may share a part of cabling. Descriptions of embodiments shown in FIG. 5A to FIG. 5C may be used as examples.

Figure 5A:
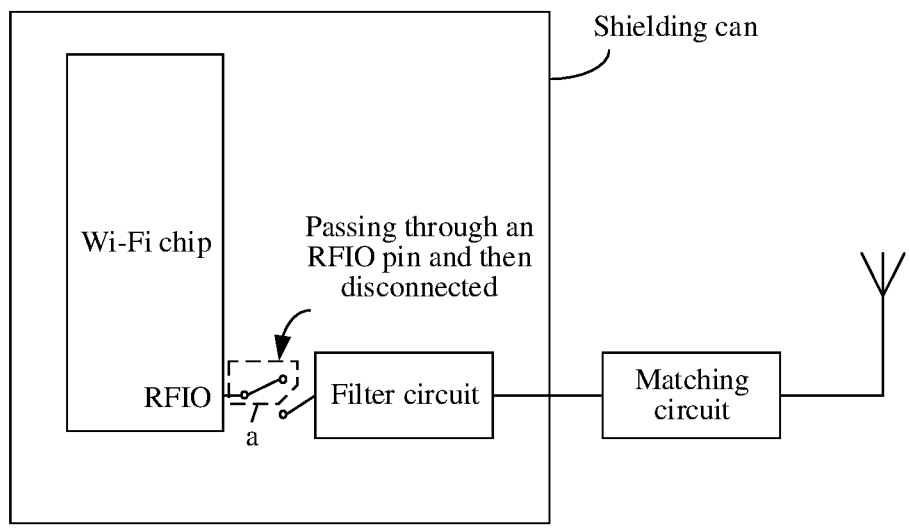
FIG. 5A to FIG. 5C are specific schematic structural diagrams of an ultra-short range wireless communication module and an antenna according to an embodiment of this application.
Figure 5B:
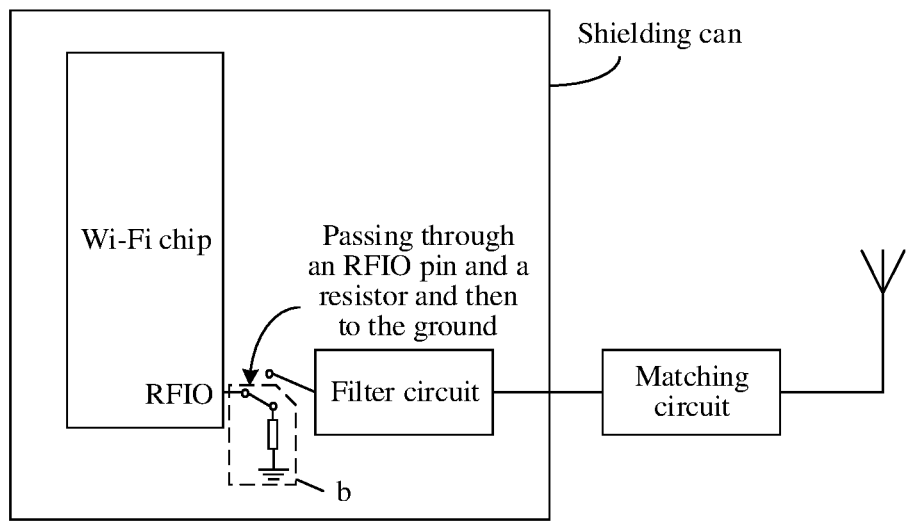
Figure 5C:
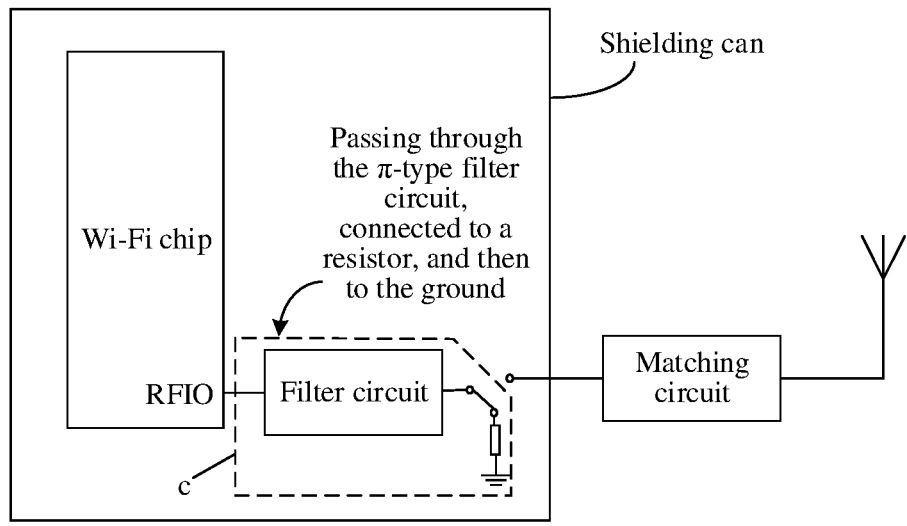

For example, FIG. 5A to FIG. 5C show three implementations of the strong antenna and the weak antenna in FIG. 4A. Structures of a wireless communication module and an antenna of the mobile device 100 may alternatively be implemented in three manners shown in FIG. 5A to FIG. 5C. As shown in FIG. 5A to FIG. 5C, the strong antenna and the weak antenna may share a part of cabling.

In embodiments of this application, the strong antenna and the weak antenna in an electronic device may be switched via a radio frequency switch. Physically, both the weak antenna (where the weak antenna is shown in a dashed box in FIG. 5A to FIG. 5C) and the radio frequency switch may be disposed in a shielding can, or the weak antenna may be disposed in a chip.

An objective of the weak antenna in embodiments of this application is to reduce a transmission distance as much as possible. A principle of constructing the weak antenna may be at least one of the following, including (1) reducing a length of the antenna, to reduce an electromagnetic wave radiated to the air, (2) reducing radiation efficiency, and converting, via a resistor, partial electromagnetic wave radiation into heat energy for consumption, and (3) reducing a return loss and reflecting partial radio frequency energy back to a chip.

The weak antenna may be specifically implemented by using at least one of the following, including (i) shortening the antenna, (ii) disconnecting from a point in a path of the strong antenna, or grounding at the point through a resistor, an inductor, or a capacitor, and (iii) using a shielding can.

It should be understood that specific implementations (i) and (ii) of the weak antenna may be implemented on a PCB board or inside a chip.

It should be further understood that a function of the shielding can is to weaken radiation.

It should be further understood that the shortening the antenna means that the weak antenna is shorter than the strong antenna. Three structures of weak antennas are shown in FIG. 5A to FIG. 5C, and the weak antennas are shown in structures in the dashed boxes in FIG. 5A to FIG. 5C. Structures of the strong antenna in FIG. 5A to FIG. 5C are all connected to a filter circuit (for example, a π-type circuit), a matching circuit (for example, a π-type circuit), and an antenna body (for example, the antenna body may be a metal cabling) outside the matching circuit through a radio frequency input/output (RFIO) pin. A weak antenna a shown in the dashed box in FIG. 5A, a weak antenna b shown in the dashed box in FIG. 5B, and a weak antenna c shown in the dashed box in FIG. 5C have different lengths, but each are shorter than the strong antenna. The filter circuit is configured to prevent interference, and the matching circuit is configured to match the strong antenna.

For example, as shown in FIG. 5A, the weak antenna a may be located in the shielding can. The weak antenna a may include the RFIO pin of a Wi-Fi chip and a first-way switch (the first-way switch is not connected to any component) in a two-way switch in the shielding can. Sometimes, the weak antenna a may further include a cabling between the RFIO pin and the first-way switch. The two-way switch refers to a switch between the cabling or the RFIO pin and the filter circuit. The cabling or the RFIO pin may be connected to or disconnected from the filter circuit via the two-way switch. As shown in FIG. 5A, the first-way switch is a switch connected to the RFIO pin or the cabling and disconnected from the filter circuit. It should be understood that the two-way switch in embodiments of this application may be a single-pole double-throw switch.

For example, as shown in FIG. 5B, the weak antenna b may be located in the shielding can. The weak antenna b may include the RFIO pin of a Wi-Fi chip, a first-way switch (the first-way switch is connected to the resistor) in a two-way switch, and a matching component in the shielding can. Sometimes, the weak antenna b may further include a first cabling between the RFIO pin and the first-way switch. Sometimes, the weak antenna b may further include a second cabling between the matching component and the ground. The matching component may be the resistor. The weak antenna b passes through the resistor and is to the ground, so that a part of electromagnetic wave radiation may be converted into heat energy for consumption, to reduce radiation efficiency of the weak antenna b. The two-way switch refers to a switch between the RFIO pin or the first cabling, the resistor, and the filter circuit. The RFIO pin or the first cabling may be connected to the resistor and disconnected from the filter circuit via the switch, or the RFIO pin or the first cabling may be disconnected from the resistor and connected to the filter circuit via the switch. The first-way switch is a switch that is in the two-way switch and that is connected to the matching component and disconnected from the filter circuit.

For example, as shown in FIG. 5C, the weak antenna c may be located in the shielding can. The weak antenna c passes through a chip-matched filter circuit, is connected to a matching component (for example, the resistor), and then is to the ground. The weak antenna c may include the RFIO pin of a Wi-Fi chip, the filter circuit, a first-way switch (the first-way switch is connected to the resistor) in a two-way switch, and a matching component (for example, the resistor) in the shielding can. Sometimes, the weak antenna c may further include a first cabling between the RFIO pin and the filter circuit. Sometimes, the weak antenna c may further include a second cabling between the filter circuit and the matching component. The weak antenna c passes through the matching component (for example, the resistor) and is to the ground, so that a part of electromagnetic wave radiation may be converted into heat energy for consumption, to reduce radiation efficiency of the weak antenna c. The two-way switch refers to a switch between the filter circuit in the shielding can, the matching component in the shielding can, and the matching circuit outside the shielding can. The filter circuit in the shielding can may be connected to the matching component in the shielding can, and disconnected from the matching circuit outside the shielding can via the two-way switch, or the filter circuit in the shielding can may be disconnected from the matching component in the shielding can, and connected to the matching circuit outside the shielding can via the two-way switch. The first-way switch is a switch configured to connect the filter circuit in the shielding can and the matching component in the shielding can.

It should be understood that the strong antennas in FIG. 5A and FIG. 5B may include the RFIO pin, a second-way switch in the two-way switch, the filter circuit, the matching circuit, and the antenna body connected outside the matching circuit. Sometimes, the strong antennas in FIG. 5A and FIG. 5B may further include a cabling between the RFIO pin and the second-way switch of the two-way switch. The second-way switch is a switch configured to connect the RFIO pin and the filter circuit.

The strong antenna in FIG. 5C may include the RFIO pin, the filter circuit, a second-way switch in the two-way switch, the matching circuit, and the antenna body connected outside the matching circuit. Sometimes, the strong antenna in FIG. 5C may further include a cabling between the RFIO pin and the filter circuit. The second-way switch is a switch configured to connect the filter circuit in the shielding can and the matching circuit outside the shielding can.

It should be understood that the wireless communication module 250 shown in FIG. 4A may be the Wi-Fi chip, or may be the Wi-Fi chip and a circuit matching the Wi-Fi chip. The wireless module 251 shown in FIG. 4B may be the Wi-Fi chip, and the wireless communication module 250 shown in FIG. 4B may be the Wi-Fi chip and a circuit matching the Wi-Fi chip.

Different structures of the weak antennas cooperate with different transmit power (Tx power) settings of the Wi-Fi chip, so that different ultra-short range communication requirements (for example, from 10 cm to 2 m) can be met.

For example, Table 1 shows communication distances of several different second antenna structures in cooperation with different transmit power of the Wi-Fi chip.

TABLE 1

| Antenna structure | Transmit power | |
|---|---|---|
| | Distance at a maximum transmit power | Distance at a minimum transmit power |
| Second antenna a | 1 m | 10 cm |
| Second antenna b | 1.5 m | 50 cm |
| Second antenna c | 2 m | 1 m |

For example, Table 2 shows communication distances of several different second antenna structures in cooperation with different transmit power of a Bluetooth chip.

TABLE 2

| Antenna structure | Transmit power | |
|---|---|---|
| | Distance at a maximum transmit power | Distance at a minimum transmit power |
| Second antenna a | 0.6 m | 5 cm |
| Second antenna b | 0.8 m | 30 cm |
| Second antenna c | 1.1 m | 45 cm |

For example, Table 3 shows communication distances of several different second antenna structures in cooperation with different transmit power of a ZigBee chip.

TABLE 3

| Antenna structure | Transmit power | |
|---|---|---|
| | Distance at a maximum transmit power | Distance at a minimum transmit power |
| Second antenna a | 0.5 m | 3 cm |
| Second antenna b | 0.7 m | 25 cm |
| Second antenna c | 0.9 m | 39 cm |

Due to a characteristic of a physical component in the chip, differences between the maximum transmit power and the minimum transmit power of the antenna are associated. If the minimum transmit power of a first device is reduced to a very low value, the maximum transmit power is also reduced. Consequently, a distance requirement during normal operation is not met. In embodiments of this application, because different smart devices have different structures and security performance requirements for the smart devices are different, manufacturers of the smart devices may use different second antenna structures and transmit power to ensure communication distances of the smart devices. For example, for manufacturers of different smart air conditioners, thicknesses of housings of the smart air conditioners may be different. In this case, when second antenna structures are the same and transmit power is the same, communication distances at which the smart air conditioners can be discovered may also be different. The manufacturers of the different smart devices may test and obtain, based on a structure of the smart device, a second antenna structure, and specific transmit power, a secure distance at which the smart device is discovered.

It should be understood that, in embodiments of this application, the first device includes a plurality of chips (for example, the first device includes a Wi-Fi chip, a Bluetooth chip, and a ZigBee chip). In this case, the Wi-Fi chip, the Bluetooth chip, and the ZigBee chip in the first device may share the first antenna and the second antenna in FIG. 5A, or the Wi-Fi chip, the Bluetooth chip, and the ZigBee chip in the first device may share the first antenna and the second antenna in FIG. 5B, or the Wi-Fi chip, the Bluetooth chip, and the ZigBee chip in the first device may share the first antenna and the second antenna in FIG. 5C.

Alternatively, the Wi-Fi chip, the Bluetooth chip, and the ZigBee chip in the first device may not share the first antenna and the second antenna.

It should be further understood that FIG. 5A to FIG. 5C show a physical first antenna and a physical second antenna, and the first device may switch the physical first antenna and the physical second antenna via the radio frequency switch. In embodiments of this application, the first device may alternatively have only one antenna physically, but include a logical first antenna and a logical second antenna.

The first device may adjust transmit power of the physical antenna, to implement the logical first antenna and the logical second antenna. For example, when the transmit power of the physical antenna is first transmit power, the physical antenna may be considered as the logical first antenna, when the transmit power of the physical antenna is second transmit power, the physical antenna may be considered as the logical second antenna, where the first transmit power is less than the second transmit power.

In a possible implementation, the first device may adjust the transmit power of the physical antenna by adjusting a component inside the chip. For example, the first device may adjust the transmit power of the physical antenna via a multi-level amplifier inside the chip.

For example, the first device may shield the multi-level amplifier inside the chip by adjusting a value of a register, so that the transmit power of the physical antenna is the first transmit power. In this case, the physical antenna may be considered as the logical first antenna. The first device may also adjust the value of the register, so that the transmit power of the physical antenna is the second transmit power. In this case, the physical antenna may be considered as the logical second antenna. The first transmit power is greater than the second transmit power.

In another possible implementation, the first device may adjust the transmit power of the physical antenna via a peripheral circuit outside the chip.

The first antenna and the second antenna in embodiments of this application may be the physical first antenna and the physical second antenna, or may be the logical first antenna and the logical second antenna.

In embodiments of this application, a same effect may be achieved when the first device switches the logical first antenna and the logical second antenna and when the first device switches the physical first antenna and the physical second antenna via the radio frequency switch.

With reference to the foregoing example, an example in which the first distance is 5 meters and the second distance is 0.3 meters is used. When the electronic device uses a strong antenna, if a distance between the electronic device (located at the center of a circle shown in FIG. 6) and the mobile device is less than the first distance (for example, when the mobile device is located at a location 1 shown in FIG. 6), the electronic device may communicate with the mobile device. When the electronic device uses a weak antenna, if a distance between the electronic device (located at the center of the circle shown in FIG. 6) and the mobile device is less than the second distance (for example, when the mobile device is located at a location 2 shown in FIG. 6), the electronic device may communicate with the mobile device.

Figure 6:
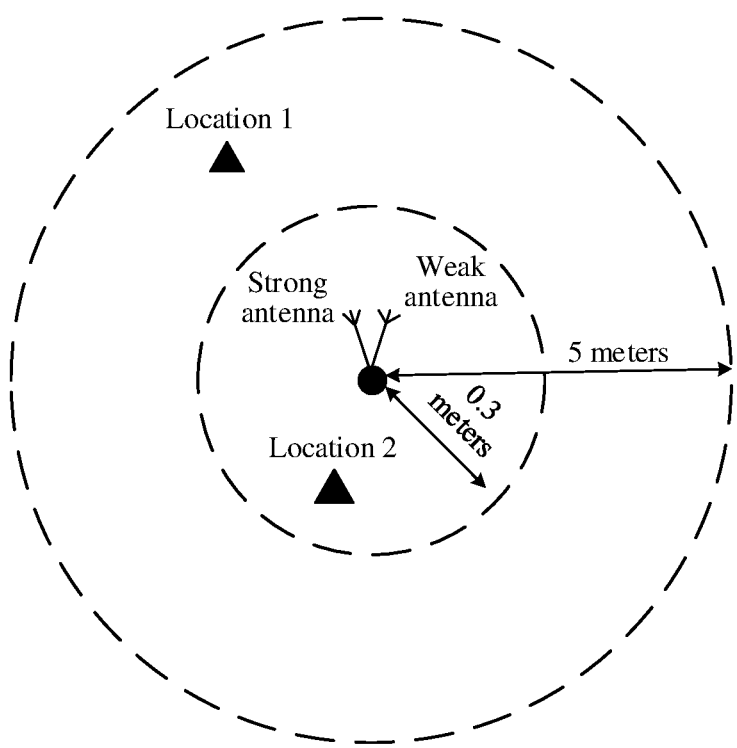
FIG. 6 is a schematic diagram of transmission distances of an ultra-short range wireless communication module and an antenna in an identity authentication method according to an embodiment of this application.

Correspondingly, when the antenna of the electronic device is configured as the first transmit power, if the distance between the electronic device (located at the center of the circle shown in FIG. 6) and the mobile device is less than the first distance (for example, when the mobile device is located at the location 1 shown in FIG. 6), the electronic device may communicate with the mobile device. When the antenna of the electronic device is configured as the second transmit power, if the distance between the electronic device (located at the center of the circle shown in FIG. 6) and the mobile device is less than the second distance (for example, when the mobile device is located at the location 2 shown in FIG. 6), the electronic device may communicate with the mobile device.

In an actual operation, precision of the first distance and the second distance is not so accurate, and an error may exist. In this way, the first distance or the second distance is a range instead of a precise numerical distance in the actual operation. In addition, in different environments, even if a same antenna and same transmit power are used, first distances may be different, and second distances may be different.

Figure 8A:
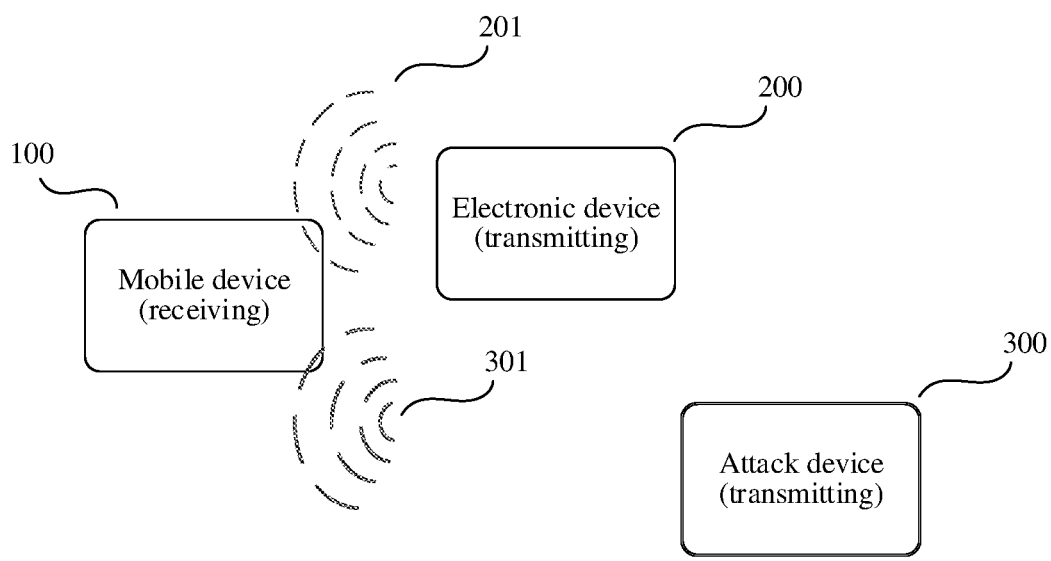
FIG. 8A and FIG. 8B are schematic diagrams of communication between an attack device that simulates an electronic device and a mobile device according to an embodiment of this application.

In the foregoing process in which the mobile device moves nearer to the electronic device and obtains information such as a key and a product ID in a plaintext form, an insecure situation may still occur. For example, as shown in FIG. 8A, although an attack device 300 is relatively far away from the electronic device 200, the attack device 300 may adjust transmit power to a proper value through an amplifier antenna of the attack device 300, so that a transmit signal of the attack device 300 reaches a preset secure distance of the electronic device 200. In this way, when a user of the mobile device 100 holds the mobile device 100 to move nearer and enter the preset secure distance of the electronic device 200, a key and a product ID in a plaintext form that are received by the mobile device 100 may not be of the electronic device 200, but may be of the attack device 300. Consequently, the mobile device 100 subsequently communicates with and interacts with the attack device 300, and may transmit some security information (for example, a service set identifier (SSID) and a password of a router connected to the mobile device) of the mobile device, causing a security vulnerability.

Therefore, it is more necessary to first verify, after the mobile device establishes an ultra-short range wireless communication connection with the peripheral device and before the security information is transmitted, whether the peripheral device connected to the mobile device is the electronic device on which the user of the mobile device intends to perform communication or control.

Figure 7:
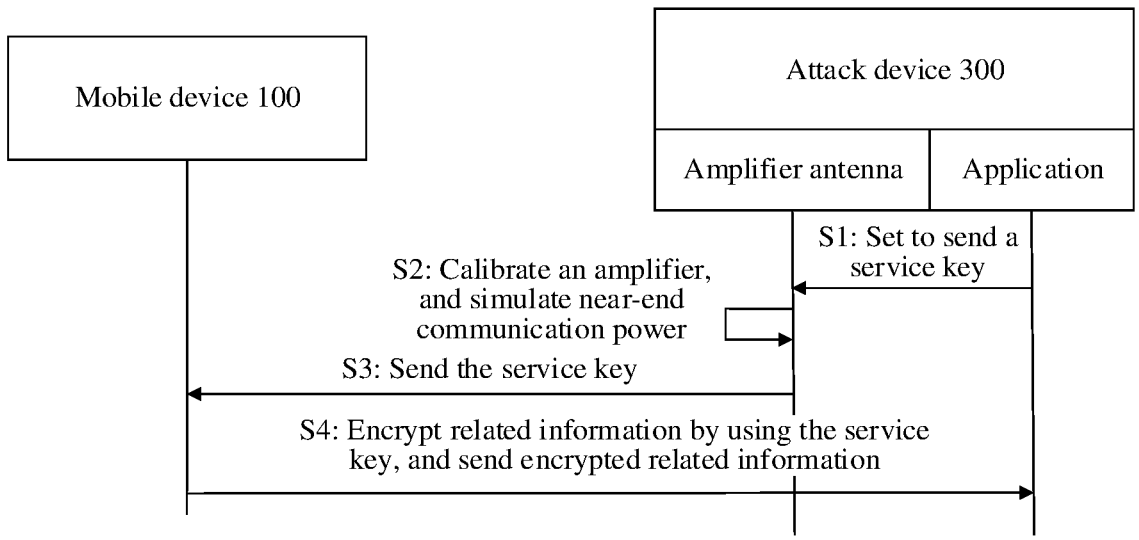
FIG. 7 is a schematic interaction diagram of communication between an attack device that simulates an electronic device and a mobile device according to an embodiment of this application.
Figure 8B:
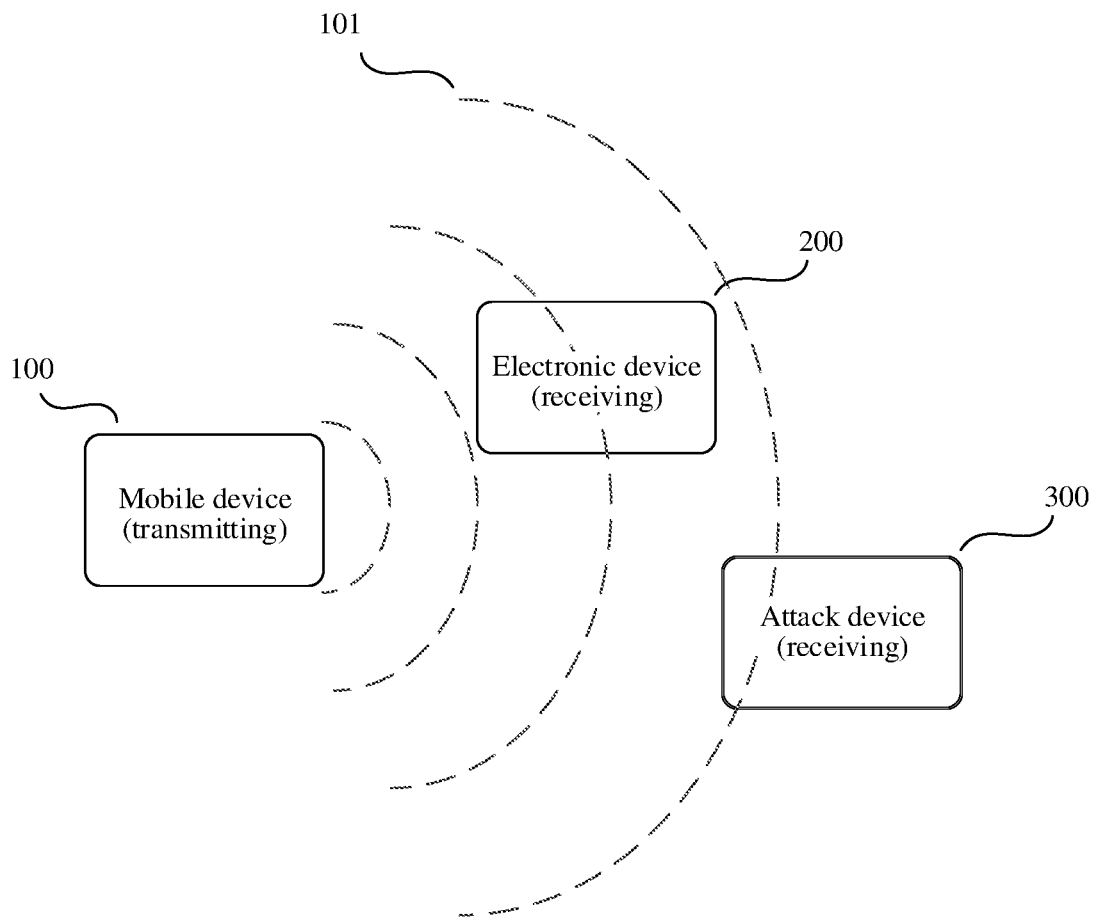

First, a communication process between the attack device 300 and the mobile device 100 is to be clearly analyzed. As shown in FIG. 7, S1: After the attack device 300 receives a trigger, an application on the attack device 300 is set to send a service key, S2: The amplifier antenna adjusts transmit power by calibrating an amplifier, so that the radio signal transmitted by the amplifier antenna of the attack device 300 reaches the preset secure distance of the electronic device 200 (as shown in FIG. 8A), then, S3: The amplifier antenna of the attack device sends information such as a service key and a product ID in a plaintext form. After the user of the mobile device 100 holds the mobile device 100 to move nearer and enter the preset secure distance of the electronic device 200, the user receives the service key. Then, S4: The mobile device encrypts the related information by using the service key, and sends encrypted related information to the attack device. For sending the encrypted related information in S4, refer to FIG. 8B. As shown in FIG. 8B, the attack device can also receive the encrypted related information, and decrypt the encrypted related information by using the service key, to obtain the related information.

The foregoing related information varies according to scenarios. For example, in a scenario in which network configuration is performed for the electronic device 200, the related information is an SSID and a password of a routing device connected to the mobile device 100, and in a scenario in which the mobile device 100 is bound to the electronic device 200, the related information is information such as an ID of the mobile device 100. In any scenario, the foregoing related information is obtained by the attack device, and consequently the foregoing related information of the mobile device 100 is illegally stolen. In particular, if some privacy information or the like is stolen, endless troubles and security threats are brought to the user of the mobile device 100, and even mental injury and property loss are caused.

Figure 9A:
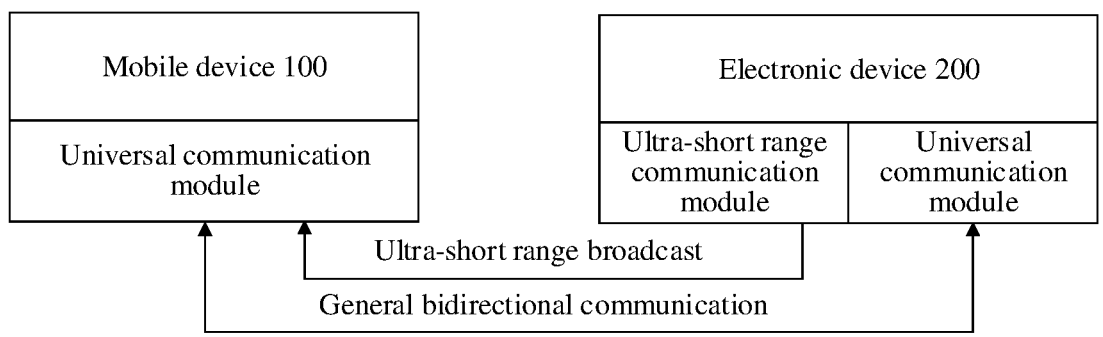
FIG. 9A is a schematic diagram of a principle of communication between a mobile device without an ultra-short range communication module and an electronic device according to an embodiment of this application.
Figure 9B:
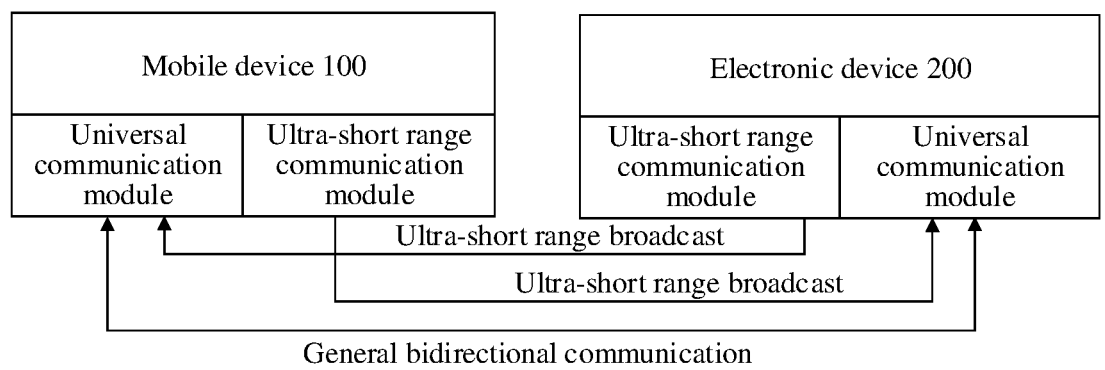
FIG. 9B is a schematic diagram of a principle of communication between a mobile device with an ultra-short range communication module and an electronic device according to an embodiment of this application.

To resolve the foregoing problem, embodiments of this application provide technical solutions for both cases in which the mobile device has an ultra-short range communication module and the mobile device does not have an ultra-short range communication module. Regardless of whether the mobile device 100 has the ultra-short range communication module or does not have the ultra-short range communication module, the electronic device 200 has an ultra-short range communication module. In addition, the mobile device 100 and the electronic device 200 each include at least a universal communication module. In an embodiment, the ultra-short range communication module sends a message in a broadcast manner. The universal communication module of the mobile device 100 may receive a message broadcast by the ultra-short range communication module of the electronic device 200, or may receive a message sent by the universal communication module of the electronic device 200. The universal communication module of the electronic device 200 may receive a message broadcast by the ultra-short range communication module of the mobile device 100, or may receive a message sent by the universal communication module of the mobile device 100. For a specific communication manner, refer to the communication manners shown in FIG. 9A and FIG. 9B. Details are not described herein again.

It should be noted that, in principle, a weak antenna is only used to broadcast a message, but is not used to receive a message. The reason is that, although the weak antenna can also receive a message, a success rate of receiving the message through the weak antenna is relatively low. In principle, a strong antenna is used to receive a message to ensure a success rate of receiving the message. However, this does not mean that the weak antenna cannot receive a message. In other words, embodiments of this application also include a solution of receiving a message through the weak antenna.

It should be noted that, in the technical solution in embodiments of this application, a communication manner between the mobile device and the electronic device includes but is not limited to BLE, Wi-Fi aware, or ZigBee.

The following describes in detail three embodiments of the identity authentication method provided in embodiments of this application with reference to FIG. 10A to FIG. 16.

Embodiment 1

Figure 10A:
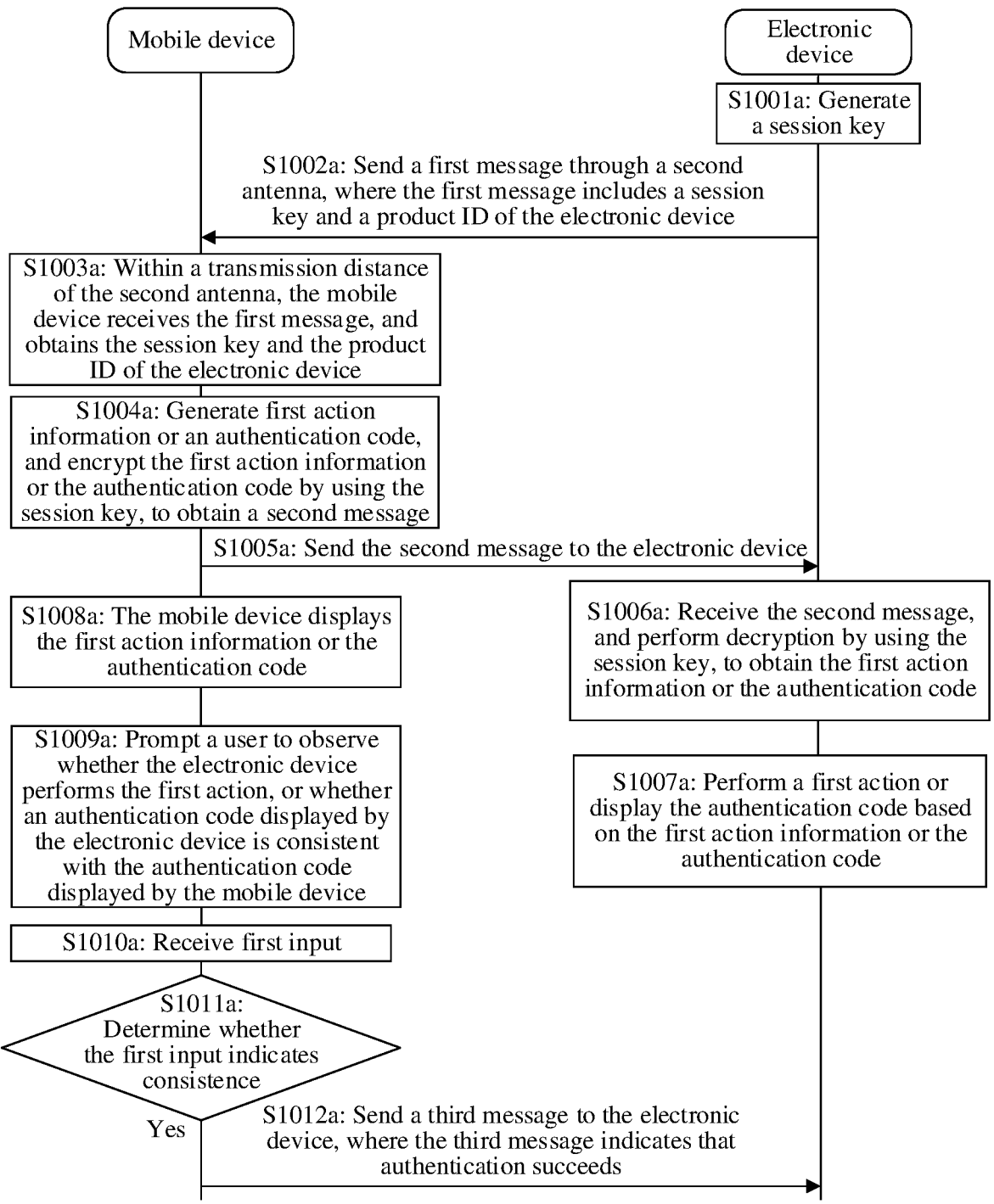
FIG. 10A and FIG. 10B are schematic diagrams of communication interaction in Embodiment 1 of an identity authentication method according to an embodiment of this application.
Figure 10B:
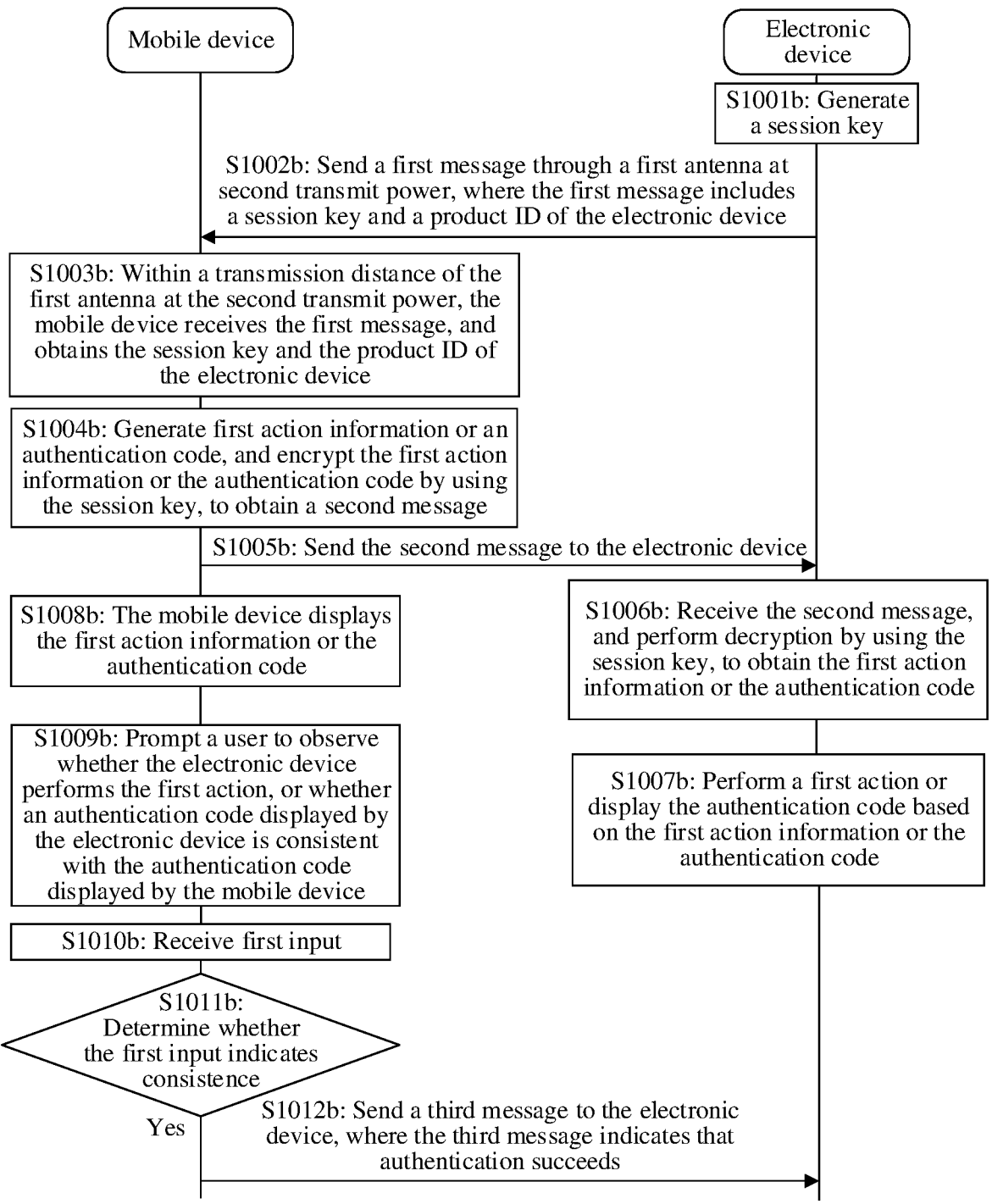

FIG. 10A and FIG. 10B are schematic diagrams of communication interaction in Embodiment 1 of an identity authentication method according to an embodiment of this application. A mobile device in the identity authentication method in FIG. 10A and FIG. 10B does not have an ultra-short range communication capability, in other words, a signal wirelessly transmitted by the mobile device cannot cover only a short range. An electronic device has an ultra-short range communication capability, in other words, a signal transmitted by the electronic device through a weak antenna or a signal transmitted by the electronic device through an antenna at low transmit power can cover only a short range. The electronic device further has an output capability (for example, the electronic device includes at least one of the following, including a display, a speaker, and an LED light). As shown in FIG. 10A, the identity authentication method includes the following steps.

S1001*a*: The electronic device generates a session key.

Specifically, the electronic device randomly generates the session key (session key).

For example, after the electronic device receives user input, the electronic device performs S1001*a*. For example, the electronic device has a button. After a user presses the button, the electronic device performs Smola.

For example, after a previous session ends, the electronic device performs Smola.

For example, after the electronic device is connected to a power supply or is powered on, the electronic device performs S1001*a*.

For example, after receiving a session request (for example, a preset data packet) of the mobile device, the electronic device performs S1001*a*.

For example, the session key is valid only after a current communication interaction procedure between the mobile device and the electronic device starts and before the current communication interaction procedure ends. For example, the electronic device is a smart speaker. After S1002*a*, the mobile device controls the smart speaker to play audio cast by the mobile device. After playing of the audio ends, if no new instruction of the mobile device is received, a current communication interaction process between the mobile device and the smart speaker ends.

For example, the session key is valid within preset duration (for example, 30 days). After the mobile device obtains the session key in S1002*a*, the mobile device stores the session key, and the electronic device also stores the session key. After 30 days, the session key of the electronic device is invalid. In this case, if the mobile device encrypts corresponding instructions based on the session key and sends a message to the electronic device, the electronic device does not execute the corresponding instructions.

S1002*a*: The electronic device sends a first message through a second antenna, where the first message includes the session key and a product ID of the electronic device.

Specifically, the second antenna is the foregoing weak antenna.

The product ID of the electronic device includes or is associated with at least one of the following information, including a model, a type, a manufacturer, a maintenance contact number, a delivery date, a warranty period, a MAC address, and the like.

In S1002*a*, the first message is sent in plaintext. However, because the electronic device sends the first message through the second antenna, only a device within a second transmission distance (also referred to as a second distance, for example, 30 cm or 10 cm) from the electronic device can receive the first message.

S1003*a*: Within the transmission distance of the second antenna, the mobile device receives the first message, and obtains the session key and the product ID of the electronic device.

If the mobile device is not located within the transmission distance of the second antenna, the mobile device cannot receive the first message, and cannot obtain the session key and the product ID of the electronic device.

S1004a: The mobile device generates first action information or an authentication code, and encrypts the first action information or the authentication code by using the session key, to obtain a second message.

Specifically, the first action information or the authentication code is randomly generated by the mobile device.

The first action information is information that indicates an action to be performed, or even indicates duration of performing the action. For example, the first action information may be that an indicator blinks three times, an indicator indicates to vibrate for 30 seconds, an indicator indicates to play sounds for 15 seconds, an indicator indicates to display a specific interface, or a combination of any two of the foregoing cases. The foregoing three times, 30 seconds, and 15 seconds are all examples, and other duration also falls within the scope of this application.

The authentication code is a printable character. For example, the authentication code may include at least one of the following, including an Arabic numeral, an English letter, a Chinese character, punctuation (like !), and a special character (like %, #, *, [, or |). The English letter can be case sensitive or case insensitive.

The first action information is randomly generated based on the obtained product ID. Specifically, information such as a type, a model, an output capability (for example, whether there is a display, whether there is an LED light, or whether there is a buzzer), and an input capability (for example, whether there is a physical keyboard, whether there is a touch control display, or whether there is a microphone) of the electronic device may be obtained based on the product ID of the electronic device. For example, if it is learned that the electronic device is an internet-of-things (IoT) light, and it is learned that the IoT light does not have a display or a speaker, and there is no input device like a keyboard or a touchscreen, the first action information is randomly generated, and the randomly generated first action information may indicate that the IoT light blinks three times. That is, when the electronic device has only one output capability, the output capability is a unique option used by the mobile device for selection. The mobile device can select, only from the output capability, a specific action or even a quantity of times or duration of the action. In addition, for example, the first action information may be a random number randomly generated by the mobile device, for example, "three" in the foregoing case in which "the IoT light blinks three times".

In addition, if it is learned, based on the product ID of the electronic device, that the electronic device has a plurality of output capabilities (for example, light blinking and voice broadcasting), the first action information may further include at least one randomly selected output capability, for example, "light blinking" and "voice broadcasting", "light blinking", or "voice broadcasting".

The authentication code is randomly generated based on the obtained product ID. Specifically, information such as a type and a model of the electronic device may be obtained based on the product ID of the electronic device. For example, if it is learned that the electronic device is a smart television (also referred to as a smart screen), and it is learned that the smart television includes a display, the authentication code is randomly generated, and the randomly generated authentication code may be displayed on the display of the smart television. That is, the authentication code is a unique option used by the mobile device for selection. The mobile device can select, only from the authentication code, a specific authentication code or even display duration of the authentication code.

In addition, the first action information and the authentication code may be selected by the mobile device based on the obtained product ID. For example, it may be learned, based on the product ID of the electronic device, that the electronic device is a smart speaker, and a model of the smart speaker indicates that the smart speaker has no display, and there is no keyboard or touch control apparatus for input. In this case, the first action information is selected for execution by the smart speaker, or the authentication code is selected for broadcasting, but the authentication code cannot be selected for display. That is, the first action information and the authentication code may be two options used by the mobile device for selection. The mobile device may first select one of the two options: the first action information and the authentication code, and then subsequently perform specific selection for the first action information or the authentication code.

Alternatively, after obtaining the information such as the model of the electronic device based on the product ID of the electronic device, the mobile device may generate the first action information and the authentication code, and encrypt the first action information and the authentication code by using the session key, to obtain the second message.

Alternatively, after obtaining the information such as the model of the electronic device based on the product ID of the electronic device, the mobile device may randomly generate the authentication code (for example, a random character string "hae098#%810"), generate a message (for example, including a header, a random character string, a tail, and a check part, where the header, the tail, and the check part are generated in a message generation mechanism) in the message generation mechanism and based on the authentication code, and then encrypt the message by using the session key, to obtain the second message.

S1005a: The mobile device sends the second message to the electronic device.

The mobile device cannot transmit a wireless communication signal within a short distance. Therefore, in S1005a, the second message sent by the mobile device to the electronic device is a ciphertext.

S1006a: The electronic device receives the second message, and performs decryption by using the session key, to obtain the first action information or the authentication code.

Because the session key is generated on an electronic device, after decrypting the second message by using the session key, the electronic device may obtain the first action information or the authentication code.

Alternatively, after a mobile device sends encrypted first action information and an encrypted authentication code, the electronic device decrypts the second message by using the session key, so as to obtain the first action information and the authentication code.

S1007a: The electronic device performs a first action or displays the authentication code based on the first action information or the authentication code.

The first action is an action indicated by the first action information. For example, if the electronic device is an IoT light, the first action may be that the IoT light blinks three times.

Correspondingly, when the electronic device is a device that has a display capability, for example, a smart television, the smart television may display the authentication code.

S1008a: The mobile device displays the first action information or the authentication code.

The mobile device displays the first action information or the authentication code, so that the user can learn of the first action information or the authentication code sent by the mobile device to the electronic device. For example, the first action information is that "the IoT light to blink three times", or the authentication code is "1234567890".

Optionally, S1008a may be performed before S1005a.

S1009a: The mobile device prompts the user to observe whether the electronic device performs the first action, or whether an authentication code displayed by the electronic device is consistent with the authentication code displayed by the mobile device.

For example, the mobile device may display a prompt window, where the prompt window includes prompted confirmation information and two options "yes" and "no". The foregoing two options are merely examples. In some implementations, specific options may be options such as "confirm" and "cancel", specific options may alternatively be options such as "yes", "no", and "cancel".

Optionally, S1008a and S1009a may be combined into one step, that is, new S1009a. For example, in new S1009a, the mobile device displays, in a manner of prompting the user for confirmation, the information for disclosing the first action or the authentication code, and two options used to confirm "yes" or "no", as shown in (B) in FIG. 14.

S1010a: The mobile device receives first input.

For example, the first input is user input for one of the foregoing two options "yes" and "no".

For example, the first input may be voice input. For example, the user inputs "yes" by voice, indicating confirmation.

S1011a: Determine whether the first input indicates consistence.

After confirming that the first input indicates consistence, the mobile device performs S1012a, to be specific, sends a third message to the electronic device.

S1012a: The mobile device sends the third message to the electronic device, where the third message indicates that authentication succeeds.

The third message is used to notify the electronic device that the identity authentication on the electronic device succeeds.

It should be noted that, the mobile device cannot establish a session with another device in a session with one device, and may establish a session with the another device only after the current session ends. Specifically, the mobile device 100 cannot establish a session with an attack device 300 in a session with the electronic device 200, and may establish a session with the attack device 300 only after the session between the mobile device 100 and the electronic device 200 ends. Similarly, the mobile device 100 cannot establish a session with the electronic device 200 in a session with the attack device 300, and may establish a session with the electronic device 200 only after the session between the mobile device 100 and the attack device 300 ends.

If the mobile device 100 establishes a session with the attack device 300, the mobile device 100 obtains a session key and a product ID of the attack device that are provided by the attack device 300. Subsequently, because the first action information or the authentication code is sent to the attack device 300, and the attack device 300 is not the electronic device 200 to which the mobile device 100 moves nearer, the electronic device 200 does not perform the first action or display the authentication code, but the attack device 300 performs the first action or displays the authentication code. After observing the electronic device 200, the user finds that the electronic device 200 does not perform the first action or display the authentication code, and may determine that the session with the mobile device 100 is established by the attack device 300 rather than the electronic device 200. In this way, the user may end the session between the mobile device 100 and the attack device 300 by choosing "No" for confirmation. In this way, related information of the user including privacy information can be prevented from being obtained by the attack device 300 subsequently.

Figure 14:
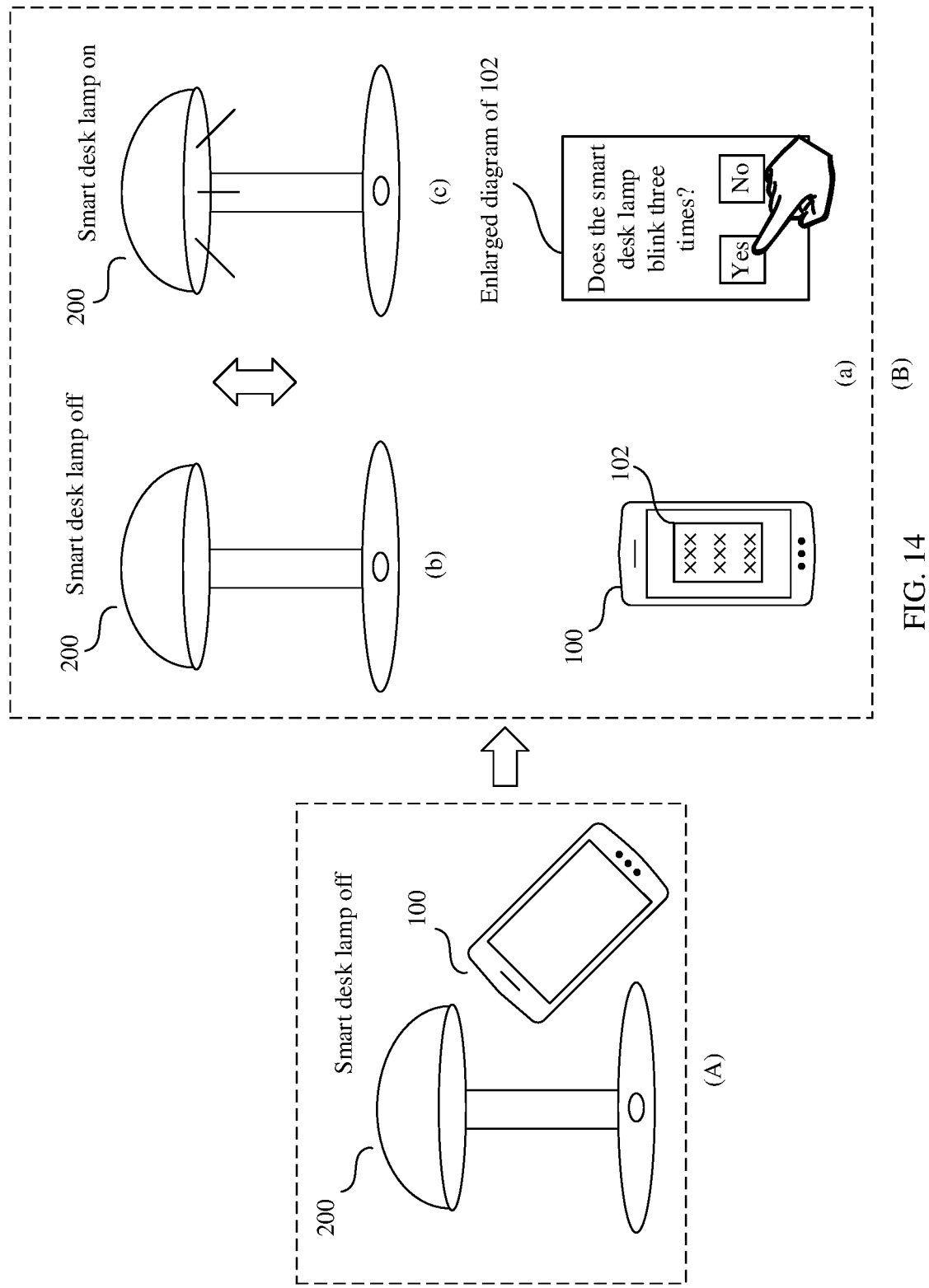
FIG. 14 and FIG. 15 are schematic diagrams of external effects of Embodiment 1 of an identity control method according to an embodiment of this application.
Figure 15:
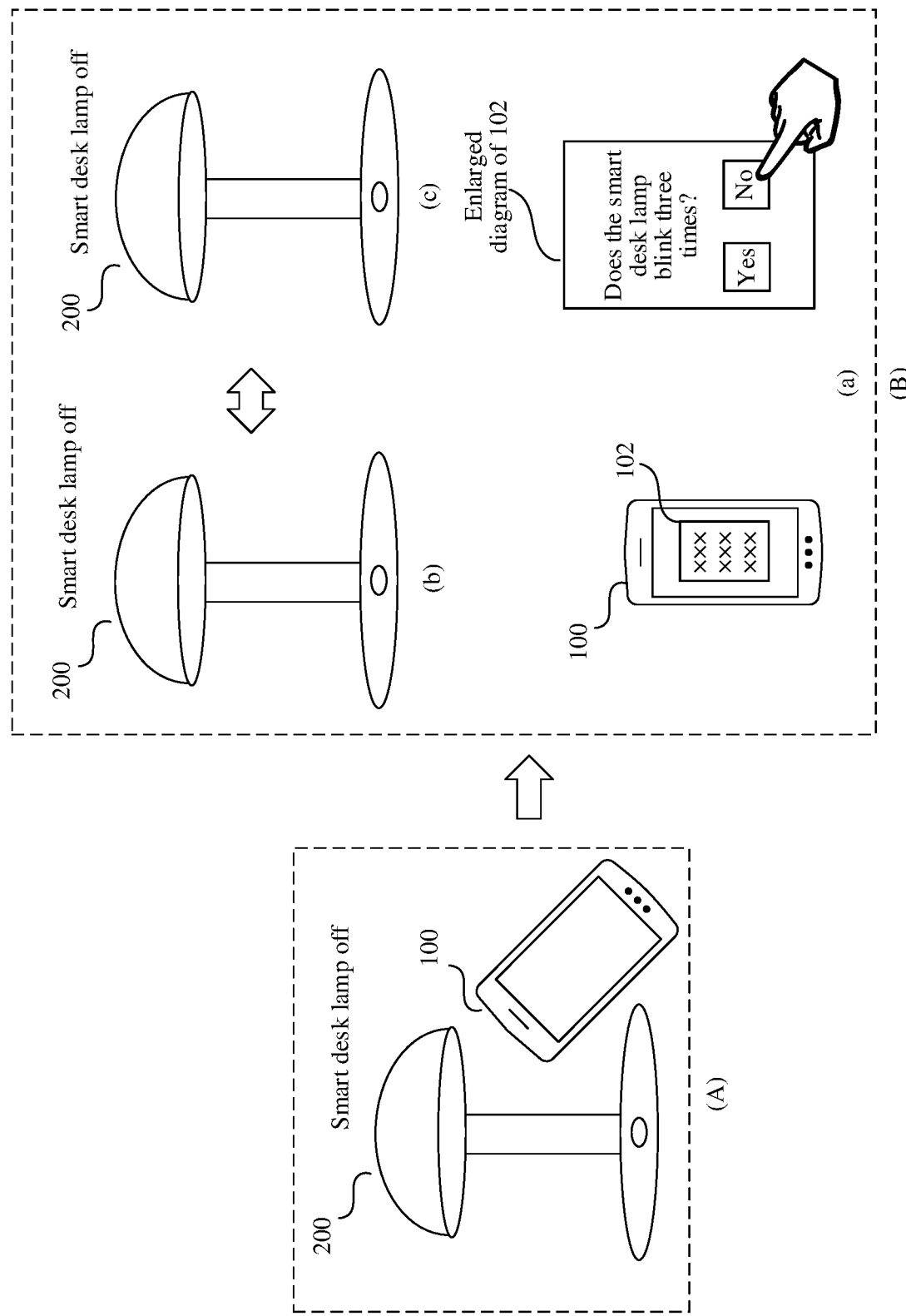

An example in which the electronic device 200 is a smart desk lamp (also referred to as an IoT desk lamp) is used for further description with reference to FIG. 14 and FIG. 15.

After receiving user input, the smart desk lamp 200 broadcasts a first message, where the first message covers a short range from the smart desk lamp 200, and the first message includes a session key randomly generated by the smart desk lamp 200 and a product ID of the smart desk lamp 200. As shown in (A) in FIG. 14, the mobile device 100 moves nearer to the smart desk lamp 200, and receives the session key and the product ID. The mobile device 100 randomly generates first action information (where for example, the first action information is that the smart desk lamp blinks three times), and encrypts the first action information by using the session key. Encrypted first action information is sent to the electronic device 200. As shown in (B) in FIG. 14, after receiving the encrypted first action information, the smart desk lamp 200 performs an action of blinking three times. The mobile device 100 displays "The smart desk lamp blinks three times" (not shown in the figure). As shown in (a) of (B) in FIG. 14, the mobile device displays a prompt window 102, and the window 102 includes confirmation information of "Does the smart desk lamp blink three times?" and two options "Yes" and "No". The user performs confirmation by observing whether the smart desk lamp 200 really blinks three times.

After the mobile device 100 moves nearer to the smart desk lamp 200, if the mobile device 100 establishes a session with the attack device 300 (simulating the smart desk lamp 200 by correcting transmit power of an amplifier antenna through the amplifier antenna), because the user observes that the smart desk lamp 200 does not blink three times (as shown in (B) in FIG. 15), the user may confirm, by using the "No" option in (a) of (B) in FIG. 15, that the mobile device 100 does not establish a session with the smart desk lamp 200. In this way, the related information such as the privacy information of the user can be prevented from being obtained by the attack device 300 subsequently, thereby ensuring information security.

In S1012a, the electronic device may send the first message through the second antenna, or the electronic device may alternatively send the first message through a first antenna at second transmit power, to achieve a same technical effect. To be specific, the ultra-short range wireless communication module in the electronic device in FIG. 10A corresponds to the principle structure in FIG. 4A, and the ultra-short range wireless communication module in the electronic device in FIG. 10B corresponds to the principle structure in FIG. 4B. A procedure of the identity authentication method shown in FIG. 10B is basically the same as the procedure of the identity authentication method shown in FIG. 10A, and only differences are two differences between S1002b and S1002a and between S1003b and S1003a. Both the two differences are that the "second antenna" is replaced with the "first antenna at the second transmit power". A related principle is described in the descriptions of FIG. 4B. Therefore, a procedure of the identity authentication method shown in FIG. 10B is not described herein again.

Embodiment 2

Figure 11A:
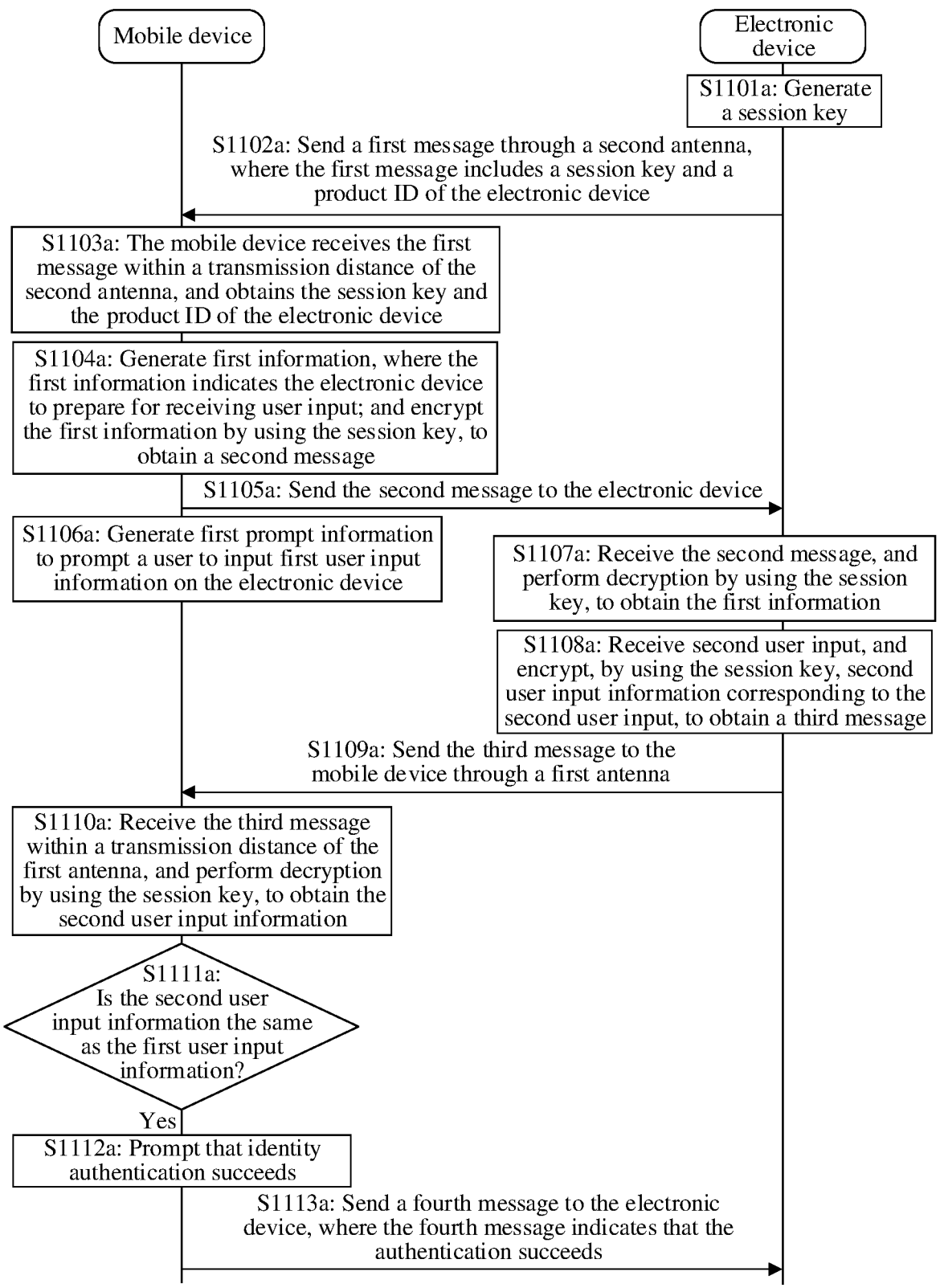
FIG. 11A and FIG. 11B are schematic diagrams of communication interaction in Embodiment 2 of an identity authentication method according to an embodiment of this application.
Figure 11B:
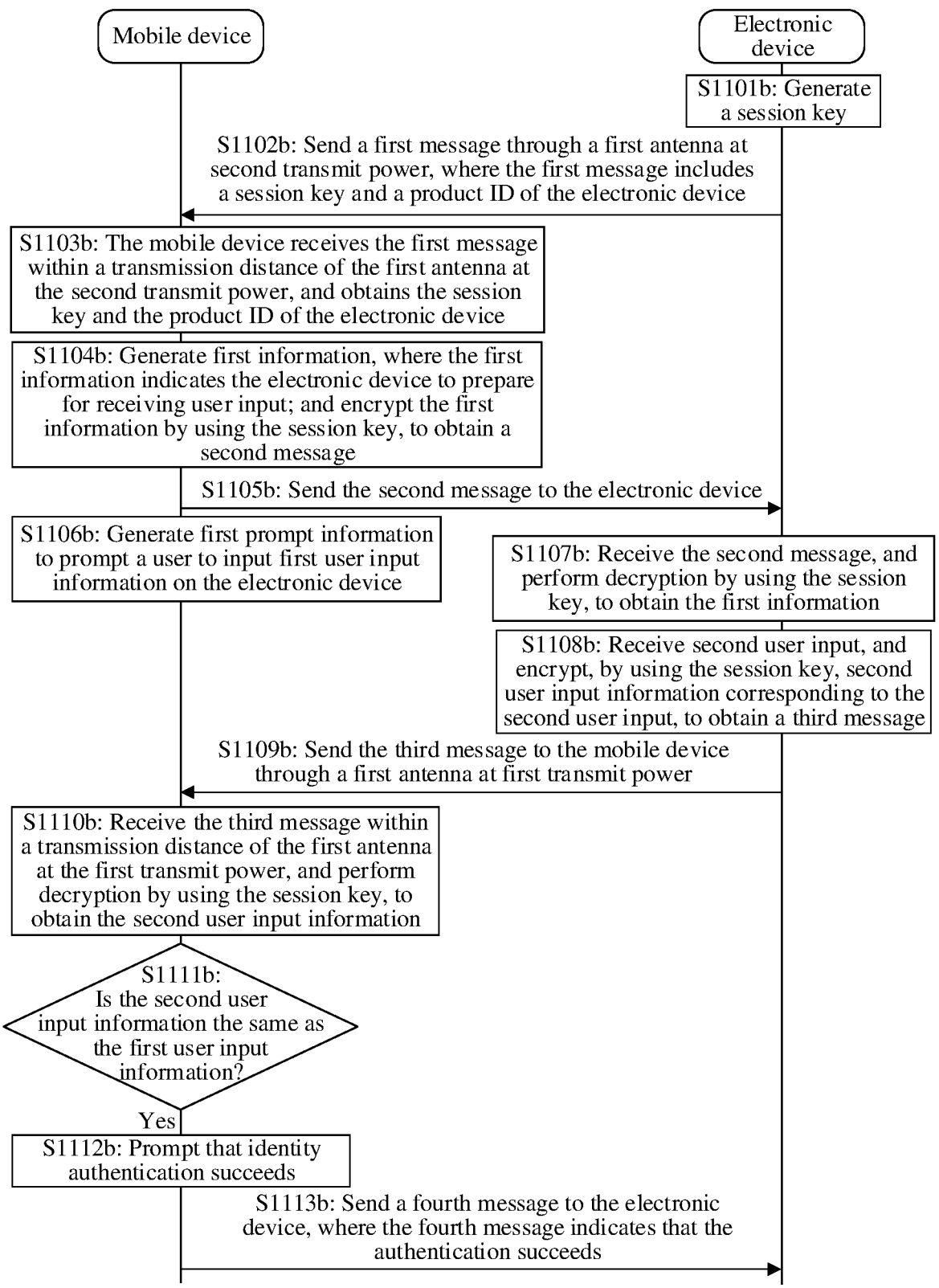

This application further provides Embodiment 2. In Embodiment 2, identity authentication on an electronic device is completed by using input on an electronic device. FIG. 11A and FIG. 11B are schematic diagrams of communication interaction in Embodiment 2 of an identity authentication method according to an embodiment of this application. A mobile device in the identity authentication method in FIG. 11A and FIG. 11B does not have an ultra-short range communication capability, in other words, a signal wirelessly transmitted by the mobile device cannot cover only a short range. The electronic device has an ultra-short range communication capability, in other words, a signal transmitted by the electronic device through a weak antenna or a signal transmitted by the electronic device through an antenna at low transmit power can cover only a short range. The electronic device further has an input capability (for example, the electronic device includes a touch control display or a keyboard). As shown in FIG. 11A, the identity authentication method includes the following steps.

S1101a to S1103a are the same as S1001a to S1003a. Refer to descriptions of Smola to S1003a. Details are not described herein again.

S1104a: Generate first information, where the first information indicates the electronic device to prepare for receiving user input, and encrypt the first information by using a session key, to obtain a second message.

The first information may be understood as indication information or notification information, and is used to subsequently notify the electronic device to prepare for receiving the user input.

S1105a: The mobile device sends the second message to the electronic device.

The mobile device cannot transmit a wireless communication signal within a short distance. Therefore, in S1105a, the second message sent by the mobile device to the electronic device is a ciphertext.

The mobile device needs to first know an address (for example, an IP address, a MAC address, or an SSID of a SoftAP) of the electronic device, so that the mobile device can send the second message to the electronic device.

In a common IP or Bluetooth communication protocol, when the mobile device sends a message to the electronic device, after receiving the message, the electronic device may sense information such as an IP address and a MAC address of the mobile device based on the communication protocol. Therefore, the second message does not need to include an ID (for example, a MAC address) of the mobile device. Similarly, in subsequent S1109a, when the electronic device sends a third message to the mobile device, the third message is generally directly returned based on an address of the mobile device.

S1106a: The mobile device generates first prompt information to prompt a user to input first user input information on the electronic device.

Specifically, the first prompt information may be displayed on the mobile device in a form of a display window, to prompt the user. For example, after it is learned, based on a product ID of the electronic device, that the electronic device is a smart television, the first prompt information may be "Enter an authentication code 1234567890 on the smart television", as shown in an enlarged schematic diagram of 103 in (B) in FIG. 16. "1234567890" is merely an example, and another authentication code may also be used. In this case, the first user input information is "1234567890".

Optionally, the first prompt information may also be played in a manner of voice. However, this manner is not an optimal manner, because in some cases, an attack device is not far away from the electronic device, and may be capable of collecting the voice.

Regardless of which manner, the authentication code is randomly generated by the mobile device.

S1107a: The electronic device receives the second message, and performs decryption by using the session key, to obtain the first information.

Because the session key is generated on an electronic device, after decrypting the second message by using the session key, the electronic device may obtain the first information.

A sequence of S1107a and S1106a is not limited in this embodiment of this application. Whether S1107a is performed before S1106a, S1106a is performed before S1107a, or S1107a and S1106a are simultaneously performed falls within the scope of this application.

S1108a: The electronic device receives second user input, and encrypts, by using the session key, second user input information corresponding to the second user input, to obtain the third message.

Figure 16:
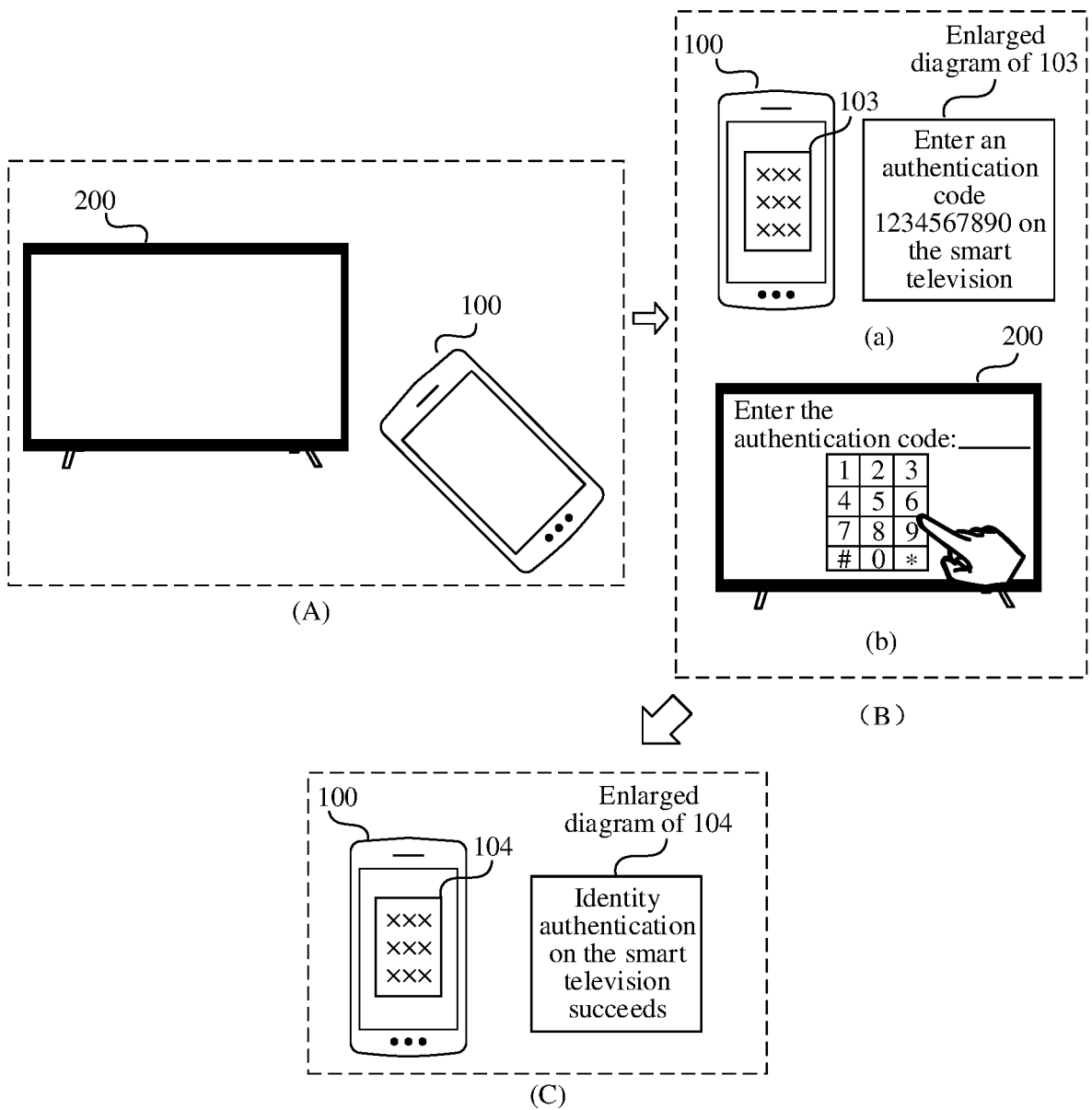
FIG. 16 is a schematic diagram of external effects of Embodiment 2 of an identity control method according to an embodiment of this application.

For example, the electronic device is a smart television, and the user may enter the authentication code by touching on a touch control display of the smart television. The authentication code is obtained by the user from the first prompt information on the mobile device. Before S1108a, the electronic device may display information such as "Enter an authentication code" and display a virtual keyboard ((B) in FIG. 16 is merely an example, and the virtual keyboard may also include another input key like a delete key and a space key, another function key like a confirm key, and an interface switch key for switching to letters, so as to switch to a keyboard interface of the letters), so as to facilitate user input, as shown in (B) in FIG. 16.

The second user input is input applied by the user to the electronic device, and the second user input information is information finally obtained by the electronic device based on the second user input. It should be noted that when second user input information is the same, second user input may be different. For example, if the user first enters "123456", then enters "space", then enters "delete", and then enters "7890", the second user input information is "1234567890". If the user directly enters "1234567890", the second user input information is "1234567890". The second user input information in two cases is the same, but the second user input in the two cases is different.

Completion of the input may be confirmed by selecting a confirm button (not shown in the figure), or completion of the input may be confirmed when an interval duration exceeds a preset threshold.

For example, the second user input may alternatively be voice input. In this case, completion of the input may be confirmed by inputting a specific confirm word by using voice, or completion of the input may be confirmed when the interval duration exceeds the preset threshold. As mentioned above, voice input is not the optional manner.

Optionally, if the electronic device does not receive the second user input within preset duration, the electronic device generates information that the user input is not received within the preset duration, and encrypts, by using the session key, the information that the user input is not received within the preset duration, where encrypted information is the third message.

S1109a: The electronic device sends the third message to the mobile device through a first antenna.

Specifically, the first antenna is the foregoing strong antenna. Because the third message is a ciphertext, communication security is also ensured. In addition, the user does not need to hold the mobile device nearer to the electronic device all the time. Otherwise, if the user needs to keep the mobile device nearer to the electronic device all the time, user experience is poor.

S110a: When the mobile device is located within a transmission distance of the first antenna, the mobile device receives the third message, and decrypts the third message by using the session key to obtain the second user input information.

In this way, an activity space of the user of the mobile device is relatively large, and is not limited to a preset secure distance.

If the mobile device is located outside the transmission distance of the first antenna, the mobile device cannot receive the third message, and consequently cannot obtain the second user input information.

Slim: Determine whether the second user input information is the same as the first user input information.

Specifically, the mobile device compares the first user input information with the second user input information, and determines whether a comparison result is that the two are the same.

If the comparison result is that the two are the same, S1112a is performed.

If the comparison result is that the two are different, it may be determined that the mobile device is having a session with the attack device in this case. Specifically, the mobile device may display information indicating that the identity authentication fails. For example, the mobile device displays "Identity authentication on the smart television fails, and there may be an attack device".

S1112a: The mobile device prompts that the identity authentication succeeds.

Specifically, the mobile device may display, on a display of the mobile device, information related to the successful identity authentication. For example, an enlarged schematic diagram of 104 in (C) in FIG. 16 shows that "Identity authentication on the smart television succeeds".

Optionally or further, the mobile device may also broadcast a voice indicating that the identity authentication succeeds. Voice broadcasting is not the optional manner. The reason is the same as that described above.

S1113a: The mobile device sends a fourth message to the electronic device, where the fourth message indicates that the authentication succeeds.

It should be noted that, the mobile device cannot establish a session with another device in a session with one device, and may establish a session with the another device only after the current session ends. Specifically, the mobile device 100 cannot establish a session with an attack device 300 in a session with the electronic device 200, and may establish a session with the attack device 300 only after the session between the mobile device 100 and the electronic device 200 ends. Similarly, the mobile device 100 cannot establish a session with the electronic device 200 in a session with the attack device 300, and may establish a session with the electronic device 200 only after the session between the mobile device 100 and the attack device 300 ends.

If the mobile device 100 establishes a session with the attack device 300, the mobile device 100 obtains a session key and a product ID of the attack device that are provided by the attack device 300. Subsequently, because the first information is sent to the attack device 300, and the attack device 300 is not the electronic device 200 to which the mobile device 100 moves nearer, when the electronic device 200 receives the second user input, the electronic device 200 does not encrypt the second user input information corresponding to the second user input, neither obtains the third message nor sends the third message to the mobile device 100 through the first antenna. As a result, a holder of the attack device cannot see the first user input information prompted by the mobile device. Therefore, the attack device cannot obtain the accurate second user input, and a third message obtained by the attack device 300 causes a result of difference in S111a. In this way, the user may learn that the mobile device 100 is currently in the session with the attack device 300. Because the identity authentication fails, the mobile device does not perform subsequent data transmission with the attack device 300, and does not send related information that is of the mobile device 100 and that includes privacy information to the attack device 300, thereby ensuring information security.

An example in which the electronic device 200 is a smart television (also referred to as a smart screen) is used for further description with reference to FIG. 16.

After receiving user input, the smart television 200 broadcasts a first message, where the first message covers a short range from the smart television 200, and the first message includes a session key randomly generated by the smart television 200 and a product ID of the smart television 200. As shown in (A) in FIG. 16, the mobile device 100 moves nearer to the smart television 200, and receives the session key and the product ID. The mobile device generates the first information, encrypts the first information by using the session key to obtain the second message, and sends the second message to the electronic device. After receiving the second message, as shown in (B) in FIG. 16, the electronic device displays a specific interface, where the specific interface includes a virtual keyboard and a prompt "Enter an authentication code". As shown in (B) in FIG. 16, the mobile device 100 generates first prompt information "Enter an authentication code 1234567890 on the smart television". Then, the user enters 1234567890 on the electronic device. As shown in (C) in FIG. 16, the mobile device displays a window 104, and the window 104 includes "Identity authentication on the smart television succeeds".

After the mobile device 100 moves nearer to the smart television 200, if the mobile device 100 establishes a session with the attack device 300 (simulating the smart television 200 by correcting transmit power of an amplifier antenna through the amplifier antenna), the smart television 200 does not send the third message to the mobile device 100 even if receiving "1234567890" entered by the user, and the attack device 300 cannot obtain "1234567890", and does not send the third message to the mobile device 100. Therefore, the mobile device 100 does not display the window 104 in (C) in FIG. 16. In this way, the related information such as the privacy information of the user can be prevented from being obtained by the attack device 300 subsequently, thereby ensuring information security.

In S1102a, the electronic device may send the first message through the second antenna, or the electronic device may alternatively send the first message through the first antenna at the second transmit power, to achieve a same technical effect. To be specific, the ultra-short range wireless communication module in the electronic device in FIG. 11A corresponds to the principle structure in FIG. 4A, and the ultra-short range wireless communication module in the electronic device in FIG. 11B corresponds to the principle structure in FIG. 4B. A procedure of the identity authentication method shown in FIG. 11B is basically the same as the procedure of the identity authentication method shown in FIG. 11A, and only differences are four differences between S1102b and S1102a, S1103b and S1103a, S1109b and S1109a, and Siii0b and Sm0a. In addition, the first two differences are that the "second antenna" is replaced with the "first antenna at the second transmit power", and the last two differences are that the "first antenna" is replaced with the "first antenna at the first transmit power". A related principle is described in the descriptions of FIG. 4B. Therefore, a procedure of the identity authentication method shown in FIG. 11B is not described herein again.

Unless otherwise specified, related content in Embodiment 2 of this application is the same as related content in Embodiment 1 of this application, and details are not described herein again.

In Embodiment 1 and Embodiment 2 of this application, although an identity of the electronic device that establishes the session with the mobile device can be identified, to implement authentication on the identity of the electronic device, the user still needs to perform confirmation (where as shown in FIG. 14 or FIG. 15, confirmation is performed on the mobile device) or input (where as shown in FIG. 16, input is performed on the electronic device). In this way, solutions in Embodiment 1 and Embodiment 2 both belong to a semi-automatic technical solution. To facilitate the user more conveniently, this application further provides a technical solution that is fully automated and the user does not need to perform confirmation.

Embodiment 3

Figure 12A:
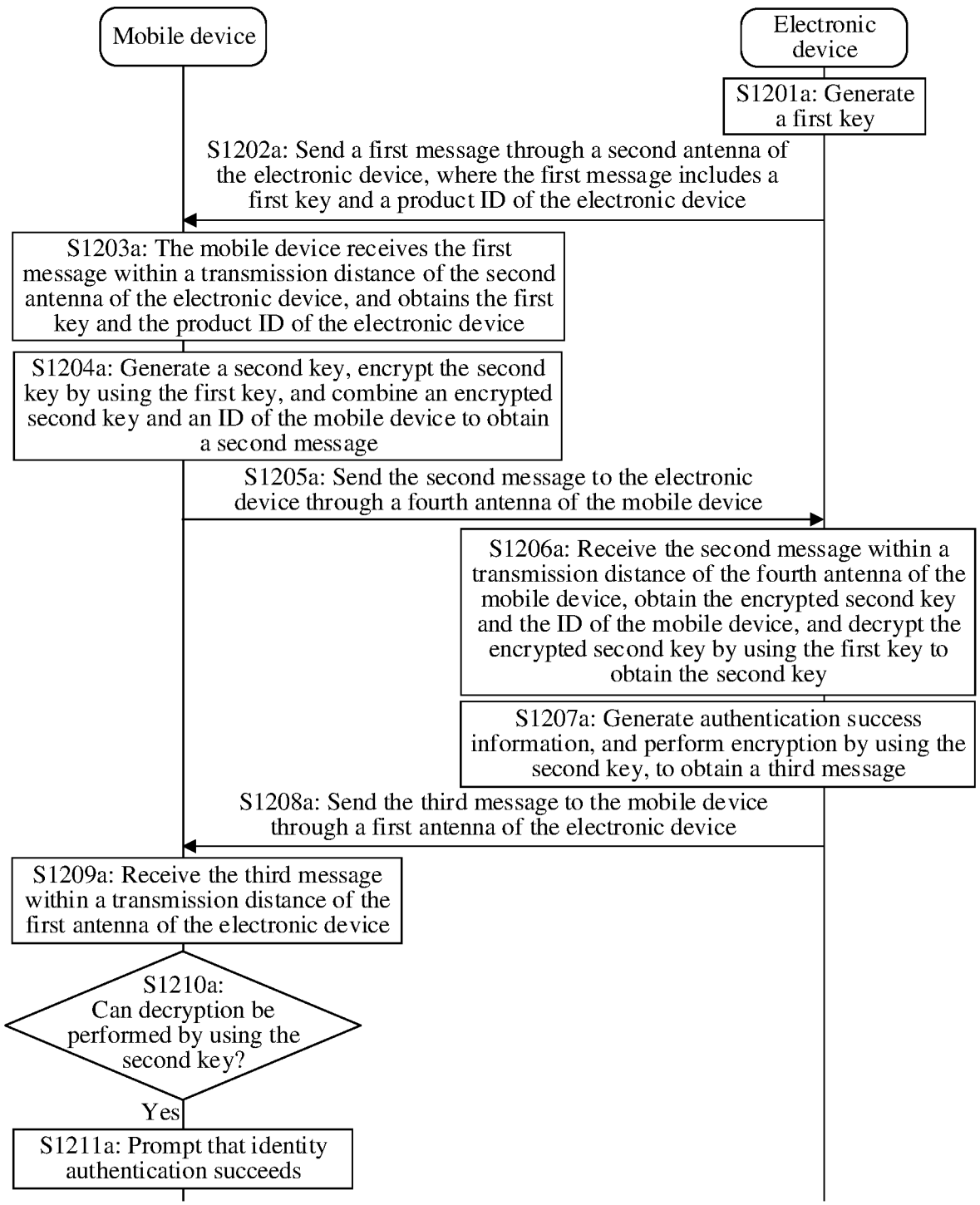
FIG. 12A and FIG. 12B are schematic diagrams of communication interaction in Embodiment 3 of an identity authentication method according to an embodiment of this application.
Figure 12B:
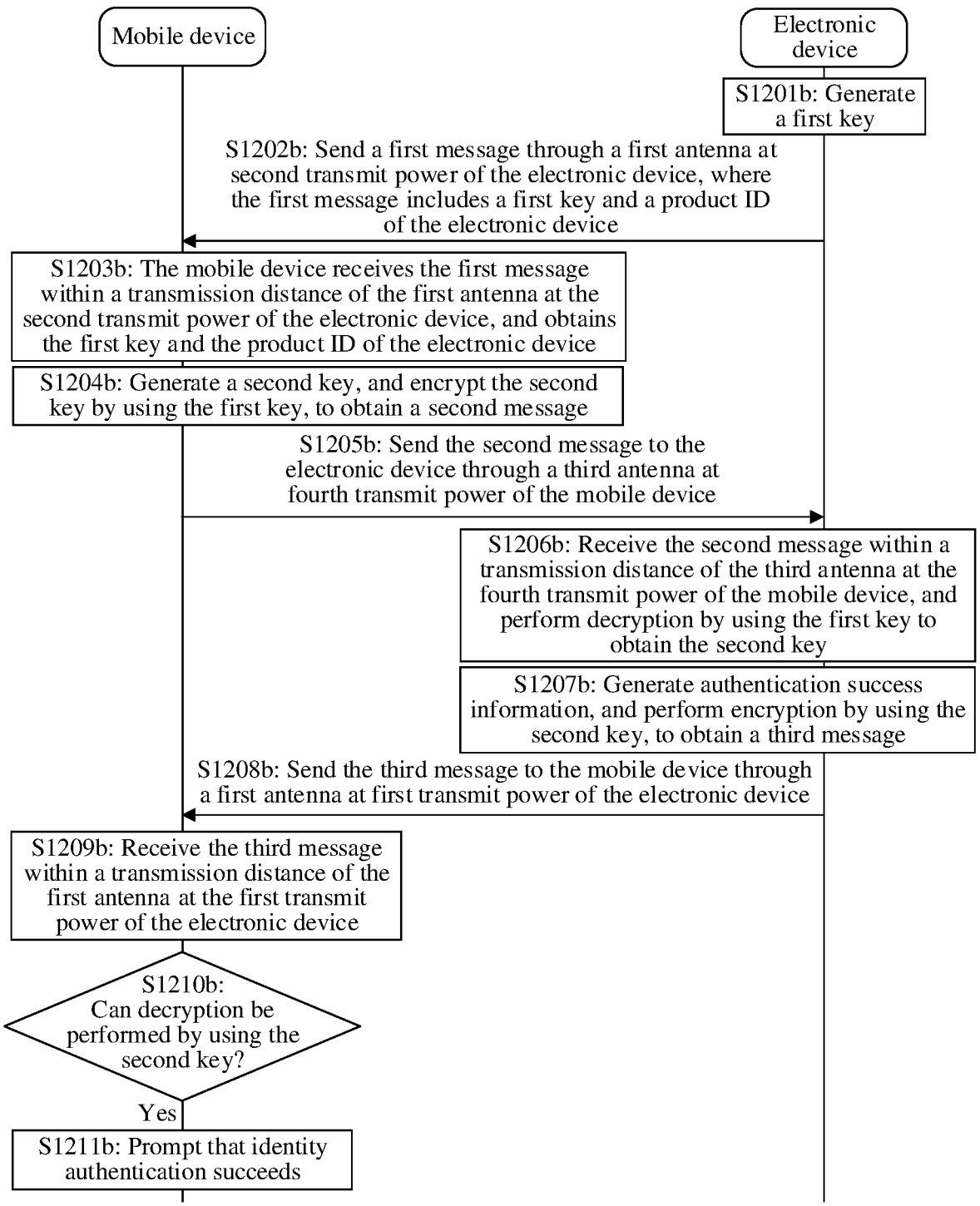

This application further provides Embodiment 3. In Embodiment 3, identity authentication can be completed without requiring confirmation or input by a user. FIG. 12A and FIG. 12B are schematic diagrams of communication interaction in Embodiment 3 of an identity authentication method according to an embodiment of this application. Both a mobile device and an electronic device in the identity authentication method in FIG. 12A and FIG. 12B have an ultra-short range communication capability. In other words, a signal transmitted by the mobile device and the electronic device through a weak antenna or a signal transmitted through an antenna at low transmit power can cover only a short range. As shown in FIG. 12A, the identity authentication method includes the following steps.

S1201a to S1203a are the same as S1001a to S1003a. Refer to descriptions of S1001a to S1003a. Details are not described herein again.

S1204a: The mobile device generates a second key, encrypts the second key by using a first key, and combines an encrypted second key and an ID of the mobile device to obtain a second message.

Specifically, the second key is randomly generated by the mobile device. In this way, the ID of the mobile device is in plaintext in the second message.

Alternatively, to prevent the ID of the mobile device from being obtained by another device, after the mobile device randomly generates the second key, the second key is combined with the ID of the mobile device to obtain information obtained by combining the two, and the information obtained by combining the two is encrypted by using the first key to obtain the second message.

For example, the ID of the mobile device includes at least one of the following: a MAC address.

That is, two manners in which the ID of the mobile device in the second message is a plaintext or a ciphertext are provided.

S1205a: The mobile device sends the second message to the electronic device through a fourth antenna of the mobile device.

The mobile device herein includes a third antenna and the fourth antenna. For the mobile device, the fourth antenna belongs to a "second antenna" of the mobile device. To avoid confusion in use of the "second antenna", the "fourth antenna" is used for expression. Correspondingly, the third antenna belongs to a "first antenna" of the mobile device. To avoid confusion, the "third antenna" is used for expression. To be specific, the "fourth antenna" is used for expression. This does not mean that the mobile device includes at least four antennas, but is intended to avoid confusion in expression. In other words, the mobile device may include two antennas: the "third antenna" and the "fourth antenna", and is not required to have four antennas.

Specifically, the fourth antenna of the mobile device is a weak antenna of the mobile device. Because the message is sent through the fourth antenna of the mobile device, the message can be received only within a transmission distance of the fourth antenna of the mobile device. In this way, communication security can be ensured even if the ID of the mobile device is sent in plaintext.

Alternatively, the ID of the mobile device may be sent in ciphertext.

Figure 17:
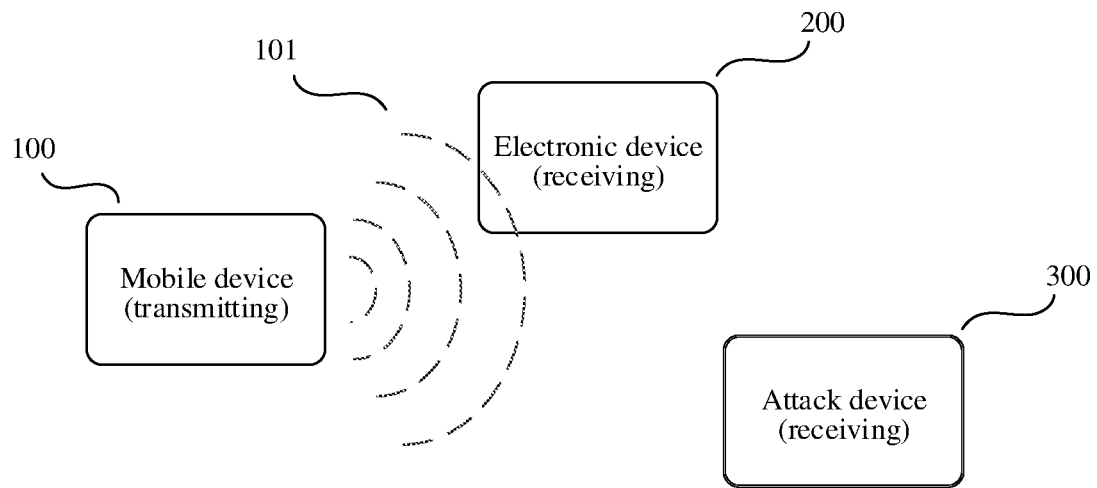
FIG. 17 is a schematic diagram of communication between an attack device that simulates an electronic device and a mobile device according to an embodiment of this application.

Regardless of whether the ID that is of the mobile device and that is included in the second message is a plaintext or a ciphertext, because the mobile device performs sending through the fourth antenna of the mobile device, the transmission distance is generally relatively short, for example, 30 cm. In this case, the attack device is not within a range of 30 cm from the mobile device, and therefore cannot monitor the second message. As shown in FIG. 17, an attack device 300 is outside coverage of a radio signal 101 transmitted by the mobile device 100, and cannot monitor the second message. In this way, it is ensured that only the electronic device 200 receives the second message, and the attack device 300 cannot monitor the second message.

S1206a: Within the transmission distance of the fourth antenna of the mobile device, the electronic device receives the second message, obtains the encrypted second key and the ID of the mobile device, and decrypts the encrypted second key by using the first key to obtain the second key.

Specifically, within the transmission distance (for example, 30 cm from the mobile device) of the fourth antenna of the mobile device, the electronic device may receive the second message, obtain the ID of the mobile device in plaintext, and obtain the second key through decryption.

Alternatively, within the transmission distance (for example, 30 cm from the mobile device) of the fourth antenna of the mobile device, the electronic device may obtain the ID of the mobile device and the second key through decryption.

The attack device is far away from the electronic device, and the mobile device is closer to the electronic device. Correspondingly, the attack device cannot be located within the transmission distance of the fourth antenna of the mobile device, and therefore the attack device cannot receive the second message.

S1207a: The electronic device generates authentication success information, and performs encryption by using the second key, to obtain a third message.

Alternatively, the authentication success information may be other information.

S1208a: The electronic device sends the third message to the mobile device through the first antenna of the electronic device.

Because the second key is used for encryption, the first antenna of the electronic device is used for sending to the mobile device. Therefore, a communication distance is relatively long, and communication security can also be ensured.

S1209a: The mobile device receives the third message within the transmission distance of the first antenna of the electronic device.

Specifically, the first antenna of the electronic device is the foregoing strong antenna in the electronic device. Because the third message is a ciphertext, communication security is also ensured. In addition, the user does not need to hold the mobile device nearer to the electronic device all the time. Otherwise, user experience is poor.

If the mobile device is located outside the transmission distance of the first antenna of the electronic device, the mobile device cannot receive the third message.

S1210a: Determine whether the mobile device can decrypt the third message by using the second key.

The mobile device attempts to decrypt the third message by using the second key.

If the third message can be decrypted by using the second key, S1211a is performed.

S1211a: The mobile device prompts that the identity authentication succeeds.

Specifically, the mobile device may display, on a display of the mobile device, that the identity authentication on the electronic device succeeds.

Figure 18:
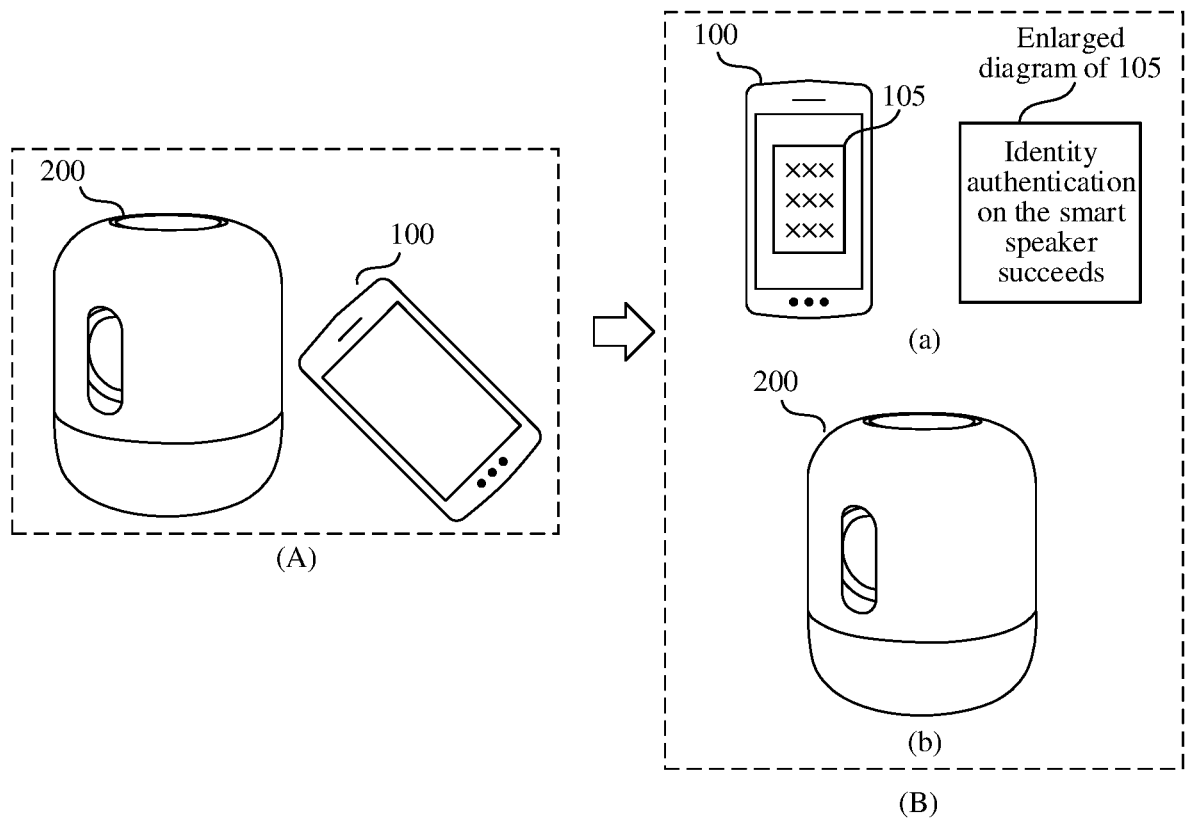
FIG. 18 is a schematic diagram of external effects of Embodiment 3 and Embodiment 4 of an identity control method according to an embodiment of this application.

Specifically, the mobile device may display, on the display of the mobile device, information related to the successful identity authentication. For example, an enlarged schematic diagram of 105 in (B) in FIG. 18 shows that "Identity authentication on the smart speaker succeeds".

Optionally or further, the mobile device may also broadcast a voice indicating that the identity authentication succeeds. Voice broadcasting is not the optional manner. The reason is the same as that described above.

It should be noted that, the mobile device cannot establish a session with another device in a session with one device, and may establish a session with the another device only after the current session ends. Specifically, the mobile device 100 cannot establish a session with the attack device 300 in a session with the electronic device 200, and may establish a session with the attack device 300 only after the session between the mobile device 100 and the electronic device 200 ends. Similarly, the mobile device 100 cannot establish a session with the electronic device 200 in a session with the attack device 300, and may establish a session with the electronic device 200 only after the session between the mobile device 100 and the attack device 300 ends.

If the mobile device 100 establishes a session with the attack device 300, the mobile device 100 obtains a session key and a product ID of the attack device 300 that are provided by the attack device 300. Subsequently, because the attack device 300 is not located within the short range from the mobile device mo, the attack device 300 cannot receive the second message, and cannot obtain the key randomly generated on the mobile device 100. Consequently, a subsequent procedure cannot be performed. In this way, if the identity authentication fails, the mobile device does not perform subsequent data transmission with the attack device 300, and does not send related information that is of the mobile device 100 and that includes privacy information to the attack device 300, thereby ensuring information security.

An example in which the electronic device 200 is a smart speaker is used for further description with reference to FIG. 18.

After receiving user input, the smart speaker 200 broadcasts a first message, where the first message covers a short range from the smart speaker 200, and the first message includes a first key randomly generated by the smart speaker 200 and a product ID of the smart speaker 200. As shown in (A) in FIG. 18, the mobile device 100 moves nearer to the smart speaker 200, and receives the session key and the product ID. The mobile device randomly generates a second key, encrypts the second key by using the first key, to obtain a second message, and sends the second message to the smart speaker 200. After receiving the second message, the smart speaker 200 performs decryption by using the first key to obtain the second key, generates authentication success information, obtains a third message after encryption by using the second key, and sends the third message to the mobile device 100. After receiving the third message, the mobile device 100 can decrypt the message by using the second key. As shown in a window 105 in (B) in FIG. 18, the mobile device 100 displays "Identity authentication on the smart speaker succeeds".

After the mobile device 100 moves nearer to the smart television 200, if the mobile device 100 establishes a session with the attack device 300 (simulating the smart television 200 by correcting transmit power of an amplifier antenna through the amplifier antenna), because the attack device 300 is outside the short range from the mobile device mo, the attack device 300 cannot receive the second message, and cannot obtain the second key randomly generated on the mobile device 100, the identity authentication cannot succeed, and a subsequent procedure cannot be continued. In this way, the related information such as the privacy information of the user can be prevented from being obtained by the attack device 300 subsequently, thereby ensuring information security.

In S1202a, the electronic device may send the first message through the second antenna of the electronic device, or the electronic device may alternatively send the first message through the first antenna at second transmit power of the electronic device, to achieve a same technical effect. Correspondingly, in S1205a, the mobile device may send the second message through the fourth antenna of the mobile device, or the mobile device may alternatively send the second message through the third antenna at fourth transmit power of the mobile device. That is, an ultra-short range wireless communication module in the electronic device in FIG. 12A and an ultra-short range wireless communication module in the mobile device in FIG. 12A both correspond to the principle structure in FIG. 4A, and an ultra-short range wireless communication module in the electronic device in FIG. 12B and an ultra-short range wireless communication module in the mobile device in FIG. 12B both correspond to the principle structure in FIG. 4B. A procedure of the identity authentication method shown in FIG. 12B is basically the same as a procedure of the identity authentication method shown in FIG. 12A, and only differences are six differences between S1202b and S1202a, S1203b and S1203a, S1205b and S1205a, S1206b and S1206a, S1208b and S1208a, and S1209b and S1209a. In addition, the first two differences are that the "second antenna" is replaced with the "first antenna at the second transmit power", the middle two differences are that the "fourth antenna" is replaced with the "third antenna at the fourth transmit power", and the last two differences are that the "first antenna" is replaced with the "first antenna at the first transmit power". A related principle is described in the descriptions of FIG. 4B. Therefore, a procedure of the identity authentication method shown in FIG. 12B is not described herein again.

For the mobile device, the fourth transmit power belongs to the "second transmit power" of the mobile device. To avoid confusion in use of the "second transmit power", the "fourth transmit power" is used for expression. Correspondingly, the third transmit power belongs to the "first transmit power" of the mobile device. To avoid confusion, the "third transmit power" is used for expression. To be specific, the "fourth transmit power" is used for expression. This does not mean that the antenna included in the mobile device has four pieces of transmit power, but is intended to avoid confusion in expression. In other words, the mobile device may use antennas at the "third transmit power" and the "fourth transmit power", and the antennas of the mobile device are not required to have four pieces of transmit power.

In Embodiment 3 of this application, not only the identity of the electronic device that establishes the session with the mobile device can be identified, to implement authentication on the identity of the electronic device, but also the user does not need to perform confirmation or input. In this case, the solution in Embodiment 3 belongs to a technical solution of a fully automated identity authentication method.

Unless otherwise specified, related content in Embodiment 3 of this application is the same as related content in Embodiment 2 of this application, and details are not described herein again.

Embodiment 4

Figure 13A:
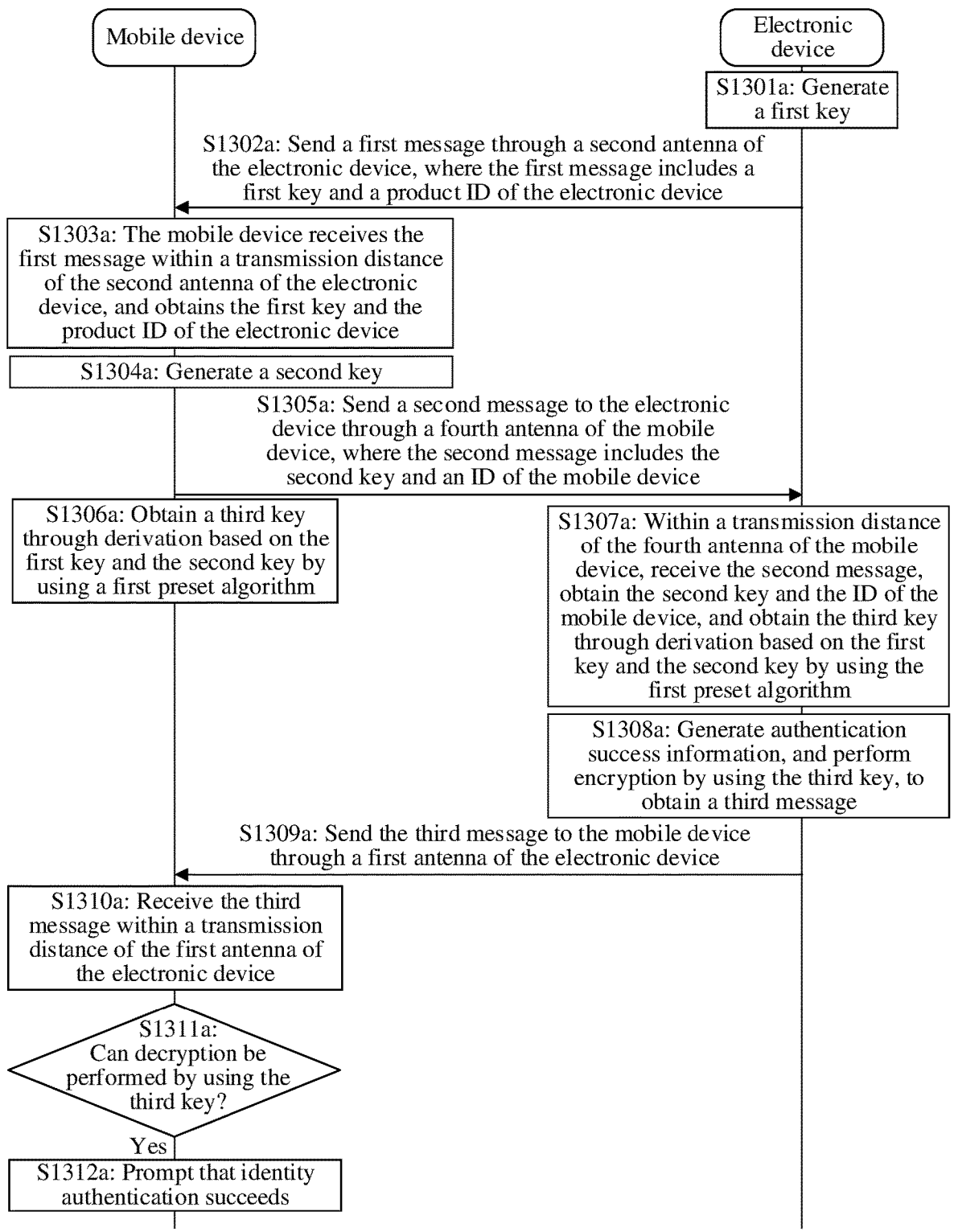
FIG. 13A and FIG. 13B are schematic diagrams of communication interaction in Embodiment 4 of an identity authentication method according to an embodiment of this application.
Figure 13B:
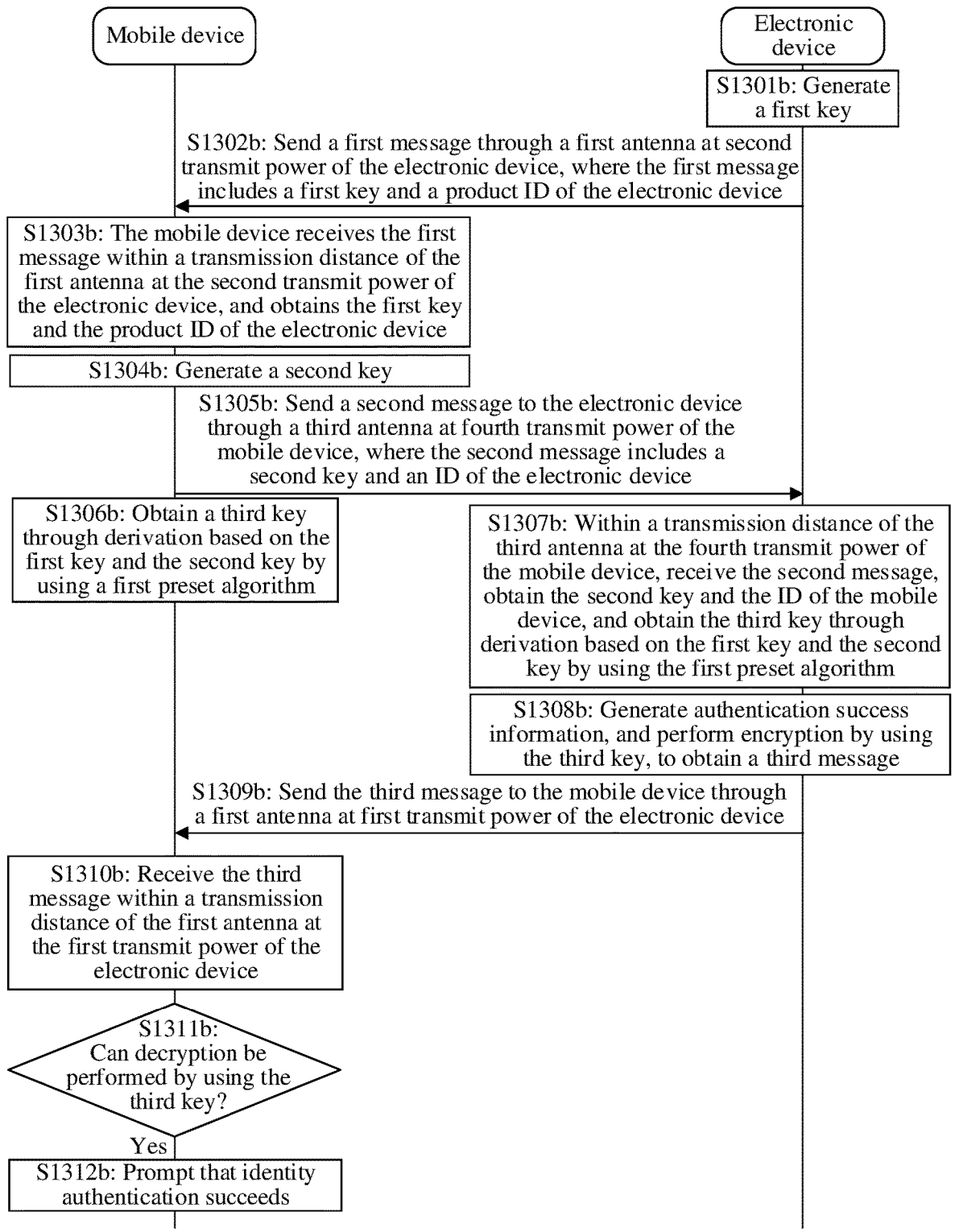

This application further provides Embodiment 4. In Embodiment 4, instead of simply using a first key generated on an electronic device or a second key generated on a mobile device, a third key is derived based on the first key and the second key, and then the third key is used as a session key. FIG. 13A and FIG. 13B are schematic diagrams of communication interaction in Embodiment 4 of an identity authentication method according to an embodiment of this application. Both a mobile device and an electronic device in the identity authentication method in FIG. 13A and FIG. 13B have an ultra-short range communication capability. In other words, a signal transmitted by the mobile device and the electronic device through a weak antenna or a signal transmitted through an antenna at low transmit power can cover only a short range. As shown in FIG. 13A, the identity authentication method includes the following steps.

S1301a to S1303a are the same as S1001a to S1003a. Refer to descriptions of Smola to S1003a. Details are not described herein again.

S1304a: The mobile device generates the second key.

Specifically, the mobile device randomly generates the second key.

S1305a: The mobile device sends a second message to the electronic device through a fourth antenna of the mobile device, where the second message includes the second key and an ID of the mobile device.

For the mobile device, the fourth antenna belongs to a "second antenna" of the mobile device. To avoid confusion in use of the "second antenna", the "fourth antenna" is used for expression. Correspondingly, a third antenna belongs to a "first antenna" of the mobile device. To avoid confusion, the "third antenna" is used for expression. To be specific, the "fourth antenna" is used for expression. This does not mean that the mobile device includes at least four antennas, but is intended to avoid confusion in expression. In other words, the mobile device may include two antennas: the "third antenna" and the "fourth antenna", and is not required to have four antennas.

Specifically, the fourth antenna of the mobile device is a weak antenna of the mobile device. Because the message is sent through the fourth antenna of the mobile device, the message can be received only within a transmission distance of the fourth antenna of the mobile device. In this way, communication security can be ensured even if the ID of the mobile device is sent in plaintext.

Alternatively, the ID of the mobile device may be sent in ciphertext.

Regardless of whether the ID that is of the mobile device and that is included in the second message is a plaintext or a ciphertext, because the mobile device performs sending through the fourth antenna of the mobile device, the transmission distance is generally relatively short, for example, 30 cm. In this case, the attack device is not within a range of 30 cm from the mobile device, and therefore cannot monitor the second message. As shown in FIG. 17, an attack device 300 is outside coverage of a radio signal 101 transmitted by the mobile device 100, and cannot monitor the second message. In this way, it is ensured that only the electronic device 200 receives the second message, and the attack device 300 cannot monitor the second message.

S1306a: The mobile device obtains the third key through derivation based on the first key and the second key by using a first preset algorithm.

Specifically, the first preset algorithm is preset in the mobile device.

The first key and the second key are pieces of input, the first preset algorithm is a function, and a derivation result is the third key.

For example, the first preset algorithm may be disclosed to only the mobile device and the electronic device, or may be disclosed to all devices.

S1307a: Within the transmission distance of the fourth antenna of the mobile device, the electronic device receives the second message, obtains the second key and the ID of the mobile device, and obtains the third key through derivation based on the first key and the second key by using the first preset algorithm.

Specifically, within the transmission distance (for example, 30 cm from the mobile device) of the fourth antenna of the mobile device, the electronic device may receive the second message, obtain the ID of the mobile device in plaintext, and obtain the second key through decryption.

Alternatively, within the transmission distance (for example, 30 cm from the mobile device) of the fourth antenna of the mobile device, the electronic device may obtain the ID of the mobile device and the second key through decryption.

In addition, the first preset algorithm is preset in the electronic device. In this way, after obtaining the second key, the electronic device may obtain a derived result, namely, the third key through derivation based on the first key and the second key by using the first preset algorithm.

The attack device is far away from the electronic device, and the mobile device is closer to the electronic device. Correspondingly, the attack device cannot be located within the transmission distance of the fourth antenna of the mobile device, and therefore the attack device cannot receive the second message.

S1308a: The electronic device generates authentication success information, and performs encryption by using the third key, to obtain the third message.

Alternatively, the authentication success information may be other information.

S1309a: The electronic device sends the third message to the mobile device through the first antenna of the electronic device.

Because the third key is used for encryption, the first antenna of the electronic device is used for sending to the mobile device. Although a transmission distance is relatively long, communication security can also be ensured.

S1310a: The mobile device receives the third message within the transmission distance of the first antenna of the electronic device.

Specifically, the first antenna of the electronic device is the foregoing strong antenna in the electronic device. Because the third message is a ciphertext, communication security is also ensured. In addition, the user does not need to hold the mobile device nearer to the electronic device all the time. Otherwise, user experience is poor.

If the mobile device is located outside the transmission distance of the first antenna of the electronic device, the mobile device cannot receive the third message.

S1311a: Determine whether the mobile device can decrypt the third message by using the second key.

The mobile device attempts to decrypt the third message by using the second key.

If the third message can be decrypted by using the second key, S1312a is performed.

S1312a: The mobile device prompts that identity authentication succeeds.

Specifically, the mobile device may display, on a display of the mobile device, that the identity authentication on the electronic device succeeds.

Specifically, the mobile device may display, on the display of the mobile device, information related to the successful identity authentication. For example, an enlarged schematic diagram of 105 in (B) in FIG. 18 shows that "Identity authentication on the smart speaker succeeds".

Optionally or further, the mobile device may also broadcast a voice indicating that the identity authentication succeeds. Voice broadcasting is not the optional manner. The reason is the same as that described above.

It should be noted that, the mobile device cannot establish a session with another device in a session with one device, and may establish a session with the another device only after the current session ends. Specifically, the mobile device 100 cannot establish a session with the attack device 300 in a session with the electronic device 200, and may establish a session with the attack device 300 only after the session between the mobile device 100 and the electronic device 200 ends. Similarly, the mobile device 100 cannot establish a session with the electronic device 200 in a session with the attack device 300, and may establish a session with the electronic device 200 only after the session between the mobile device 100 and the attack device 300 ends.

If the mobile device 100 establishes a session with the attack device 300, the mobile device 100 obtains a session key and a product ID of the attack device 300 that are provided by the attack device 300. Subsequently, because the attack device 300 is not located in the short range from the mobile device 100, the attack device 300 cannot receive the second message, and cannot obtain the key randomly generated on the mobile device 100. Consequently, a subsequent procedure cannot be performed. In this way, if the identity authentication fails, the mobile device does not perform subsequent data transmission with the attack device 300, and does not send related information that is of the mobile device 100 and that includes privacy information to the attack device 300, thereby ensuring information security. Because the specific example of Embodiment 4 is similar to the specific example of Embodiment 3, the specific example of Embodiment 4 is not described herein again.

In S1302a, the electronic device may send the first message through the second antenna of the electronic device, or the electronic device may alternatively send the first message through the first antenna at second transmit power of the electronic device, to achieve a same technical effect. Correspondingly, in S1305a, the mobile device may send the second message through the fourth antenna of the mobile device, or the mobile device may alternatively send the second message through the third antenna at fourth transmit power of the mobile device. That is, an ultra-short range wireless communication module in the electronic device in FIG. 13A and an ultra-short range wireless communication module in the mobile device in FIG. 13A both correspond to the principle structure in FIG. 4A, and an ultra-short range wireless communication module in the electronic device in FIG. 13B and an ultra-short range wireless communication module in the mobile device in FIG. 13B both correspond to the principle structure in FIG. 4B. A procedure of the identity authentication method shown in FIG. 13B is basically the same as the procedure of the identity authentication method shown in FIG. 13A, and only differences are six differences between S1302b and S1302a, S1303b and S1303a, S1305b and S1305a, S1307b and S1307a, S1309b and S1309a, and S2310b and S1310a. In addition, the first two differences are that the "second antenna" is replaced with the "first antenna at the second transmit power", the middle two differences are that the "fourth antenna" is replaced with the "third antenna at the fourth transmit power", and the last two differences are that the "first antenna" is replaced with the "first antenna at the first transmit power". A related principle is described in the descriptions of FIG. 4B. Therefore, a procedure of the identity authentication method shown in FIG. 13B is not described herein again.

In Embodiment 4 of this application, not only an identity of the electronic device that establishes the session with the mobile device can be identified, to implement authentication on the identity of the electronic device, but also the user does not need to perform confirmation or input. The solution in Embodiment 4 belongs to a technical solution of a fully automated identity authentication method.

Embodiment 3 and Embodiment 4 of this application are relatively similar. In Embodiment 4 of this application, the first preset algorithm needs to be preset on the electronic device and the mobile device. In Embodiment 3 of this application, the foregoing presetting is not required.

Unless otherwise specified, related content in Embodiment 4 of this application is the same as related content in Embodiment 3 of this application, and details are not described herein again.

It should be noted that all or some of the foregoing embodiments provided in this application may be freely and randomly combined with each other.

The identity authentication method provided in embodiments of this application is applicable to the following mobile device and electronic device.

Figure 19:
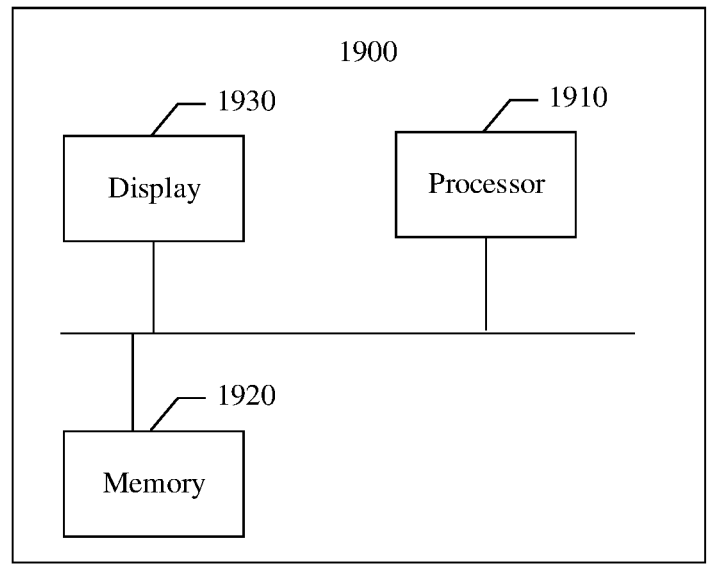
FIG. 19 is a schematic structural composition diagram of a mobile device according to an embodiment of this application.

FIG. 19 shows a mobile device 1900 according to this application. For example, the mobile device 1900 includes at least one processor 1910, a memory 1920, and a display 1930. The processor 1910 is coupled to the memory 1920 and the display 1930. The coupling in embodiments of this application may be a communication connection, may be an electrical connection, or may be in another form. Specifically, the memory 1920 is configured to store program instructions. The display 1930 is configured to display a user interface. The processor 1910 is configured to invoke the program instructions stored in the memory 1920, to enable the mobile device 1900 to perform the steps performed by the mobile device in the identity authentication method provided in embodiments of this application. It should be understood that the mobile device 1900 may be configured to implement the identity authentication method provided in embodiments of this application. For related features, refer to the foregoing descriptions. Details are not described herein again.

In some embodiments, when the display has a touch function, the display is also referred to as a touch display. An operation on the touch display may be implemented by using a virtual button. When the display has no touch function, the display is also referred to as a non-touch display. An operation on the non-touch display may be implemented by using a physical button.

This application provides a computer program product including instructions. When the computer program product runs on a mobile device, the mobile device is enabled to perform the steps performed by the mobile device in the identity authentication method provided in embodiments of this application.

This application provides a computer-readable storage medium, including instructions. When the instructions are run on a mobile device, the mobile device is enabled to perform the steps performed by the mobile device in the identity authentication method provided in embodiments of this application.

A person skilled in the art may clearly understand that embodiments of this application may be implemented by hardware, or by hardware and software. When embodiments of this application are implemented by hardware and software, the foregoing functions may be stored in a computer-readable medium. Based on such an understanding, the technical solutions of embodiments of this application essentially, or the part contributing to a conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, like a flash memory, a removable hard disk, a read-only memory, a random access memory, a magnetic disk, or an optical disc.

Figure 20:
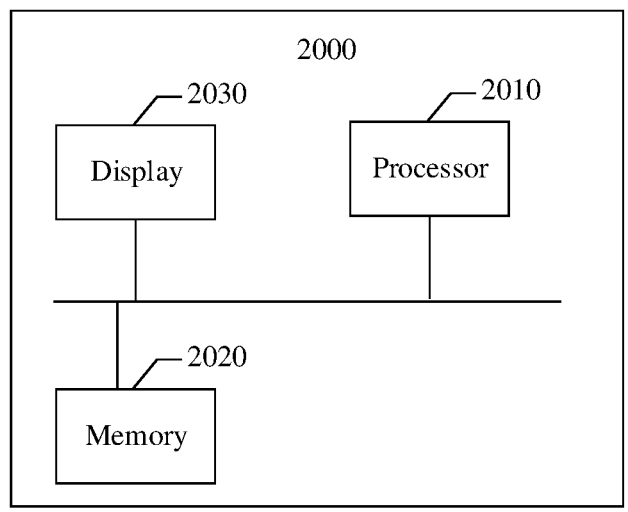
FIG. 20 is a schematic structural composition diagram of an electronic device according to an embodiment of this application.

FIG. 20 shows an electronic device 2000 according to this application. For example, the electronic device 2000 includes at least one processor 2010, a memory 2020, and a display 2030. The processor 2010 is coupled to the memory 2020 and the display 2030. The coupling in embodiments of this application may be a communication connection, may be an electrical connection, or may be in another form. Specifically, the memory 2020 is configured to store program instructions. The display 2030 is configured to display a user interface. The processor 2010 is configured to invoke the program instructions stored in the memory 2020, to enable the electronic device 2000 to perform the steps performed by the electronic device in the identity authentication method provided in embodiments of this application.

It should be understood that the electronic device 2000 may be configured to implement the identity authentication method provided in embodiments of this application. For related features, refer to the foregoing descriptions. Details are not described herein again.

In some embodiments, when the display has a touch function, the display is also referred to as a touch display. An operation on the touch display may be implemented by using a virtual button. When the display has no touch function, the display is also referred to as a non-touch display. An operation on the non-touch display may be implemented by using a physical button.

This application provides a computer program product including instructions. When the computer program product runs on an electronic device, the electronic device is enabled to perform the steps performed by the electronic device in the identity authentication method provided in embodiments of this application.

This application provides a computer-readable storage medium, including instructions. When the instructions are run on an electronic device, the electronic device is enabled to perform the steps performed by the electronic device in the identity authentication method provided in embodiments of this application.

A person skilled in the art may clearly understand that embodiments of this application may be implemented by hardware, or by hardware and software. When embodiments of this application are implemented by hardware and software, the foregoing functions may be stored in a computer-readable medium. Based on such an understanding, the technical solutions of embodiments of this application essentially, or the part contributing to a conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, like a flash memory, a removable hard disk, a read-only memory, a random access memory, a magnetic disk, or an optical disc.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A mobile device, comprising:
   at least one processor;
   a memory having a computer program stored thereon for execution by the at least one processor, the computer program including instructions for:
   receiving, from an electronic device with which the mobile device wirelessly communicates, a first message of the electronic device within a second distance, wherein the first message comprises a session key randomly generated by the electronic device;
   randomly generating, in response to the first message, first action information or an authentication code;

obtaining a second message by encrypting the first action information or the authentication code using the session key;

sending the second message to the electronic device;

displaying first confirmation information, wherein the first confirmation information is associated with determining at least one of whether the electronic device performs a first action indicated by the first action information or whether an authentication code displayed by the electronic device is the same as the authentication code displayed by the mobile device;

receiving first input for confirmation; and prompting, in response to the first input, that identity authentication on the electronic device succeeds, wherein the distance is less than or equal to a preset secure distance, and wherein the preset secure distance is a secure distance for exchanging secret information between the mobile device and the electronic device.

2. The mobile device according to claim 1, wherein the computer program further includes instructions for performing, before the displaying the first confirmation information:

displaying the first action information or the authentication code.

3. The mobile device according to claim 2, wherein the computer program further includes instructions for performing, before or after the sending the second message to the electronic device:

displaying the first action information or the authentication code.

4. The mobile device according to claim 2, wherein the first input is by a user and confirms that the electronic device performs the first action or that the authentication code displayed by the electronic device is the same as the authentication code displayed by the mobile device.

5. The mobile device according to claim 4, wherein the first input is one of selection of a confirm button, an interval duration exceeds a preset threshold, or a voice input inputting a confirm word by the user using voice.

6. The mobile device according to claim 1, further comprising displaying information indicating that the identity authentication fails, in response to the first input failing to indicate confirmation that the electronic device performs the first action or that the authentication code displayed by the electronic device is the same as the authentication code displayed by the mobile device.

7. The mobile device according to claim 1, wherein the prompting, in response to the first input, that identity authentication on the electronic device succeeds is performed in response to the first input indicating confirmation that the electronic device performs the first action or that the authentication code displayed by the electronic device is the same as the authentication code displayed by the mobile device.

8. A system, comprising:
the mobile device of claim 1; and
an electronic device comprising:
at least one processor;
a first antenna, wherein a transmission distance of the first antenna is a first distance, and the first distance is greater than a preset secure distance;
a second antenna, wherein a transmission distance of the second antenna is a second distance, the second distance is less than or equal to the preset secure distance, and the first antenna and the second antenna are different antennas; and a memory having a computer program stored thereon for execution by the at least one processor, the computer program including instructions for:

receiving input;
randomly generating a session key in response to the input;
broadcasting a first message through the second antenna, wherein the first message comprises the session key;
receiving a second message from the mobile device; and
performing, in response to the second message, a first action indicated by first action information, or displaying an authentication code.

9. The system according to claim 8, wherein the first message further comprises product identification information of the electronic device.

10. An electronic device, comprising:
at least one processor;
an antenna, wherein a transmission distance of the antenna at first transmit power is a first distance, and the first distance is greater than a preset secure distance; a transmission distance of the antenna at second transmit power is a second distance, and the second distance is less than or equal to the preset secure distance; and the first transmit power is greater than the second transmit power; and
a memory having a computer program stored thereon for execution by the at least one processor, the computer program including instructions for:
receiving input;
randomly generating a session key in response to the input;
broadcasting a first message through the antenna at the second transmit power, wherein the first message comprises the session key;
receiving a second message from a mobile device that wirelessly communicates with the electronic device; and
performing, in response to the second message, a first action indicated by first action information, or displaying an authentication code.

11. The electronic device according to claim 10, wherein the first message further comprises product identification information of the electronic device.

12. An identity authentication method, comprising:
receiving, by a mobile device that wirelessly communicates with an electronic device, a first message of the electronic device within a distance from the electronic device, wherein the first message comprises a session key randomly generated by the electronic device;
randomly generating, by the mobile device, first action information or an authentication code in response to the first message;
obtaining a second message by encrypting the first action information or the authentication code by using the session key;
sending the second message to the electronic device;
displaying first confirmation information, wherein the first confirmation information is associated with determining at least one of whether the electronic device performs a first action indicated by the first action information, or whether an authentication code prompted by the electronic device is the same as the authentication code displayed by the mobile device;
receiving first input for confirmation; and
prompting, in response to the first input, that identity authentication on the electronic device succeeds,
wherein the distance is less than or equal to a preset secure distance, and wherein the preset secure distance is a secure distance for exchanging secret information between the mobile device and the electronic device.

13. The method according to claim 12, further comprising performing, before the displaying the first confirmation information:
    displaying the first action information or the authentication code.

14. The method according to claim 13, further comprising performing, before or after the sending the second message to the electronic device:
    displaying the first action information or the authentication code.

15. The method according to claim 13, wherein the first input is by a user and confirms that the electronic device performs the first action or that the authentication code displayed by the electronic device is the same as the authentication code displayed by the mobile device.

16. The method according to claim 15, wherein the first input is one of selection of a confirm button, an interval duration exceeds a preset threshold, or a voice input inputting a confirm word by the user using voice.

17. The method according to claim 12, further comprising displaying information indicating that the identity authentication fails, in response to the first input failing to indicate confirmation that the electronic device performs the first action or that the authentication code displayed by the electronic device is the same as the authentication code displayed by the mobile device.

18. The method according to claim 12, wherein the prompting, in response to the first input, that identity authentication on the electronic device succeeds is performed in response to the first input indicating confirmation that the electronic device performs the first action or that the authentication code displayed by the electronic device is the same as the authentication code displayed by the mobile device.

19. The method of claim 12, further comprising
    receiving input by the electronic device;
    randomly generating the session key in response to the input;
    broadcasting the first message, wherein the first message comprises the session key;
    receiving the second message from the mobile device; and
    performing, in response to the second message, the first action indicated by the first action information, or displaying the authentication code.

20. The method according to claim 19, wherein the first message further comprises product identification information of the electronic device.

* * * * *